United States Patent
Tsuchiya

(10) Patent No.: US 10,126,701 B2
(45) Date of Patent: Nov. 13, 2018

(54) LOCK STRUCTURE AND IMAGE FORMING APPARATUS

(71) Applicant: KYOCERA Document Solutions Inc., Osaka (JP)

(72) Inventor: Hiroaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/715,908

(22) Filed: Sep. 26, 2017

(65) Prior Publication Data

US 2018/0095408 A1 Apr. 5, 2018

(30) Foreign Application Priority Data

Oct. 5, 2016 (JP) .................................. 2016-197127
Jul. 20, 2017 (JP) .................................. 2017-140846

(51) Int. Cl.
G03G 21/16 (2006.01)
H04N 1/00 (2006.01)

(52) U.S. Cl.
CPC ..... *G03G 21/1633* (2013.01); *G03G 21/1647* (2013.01); *H04N 1/00551* (2013.01); *G03G 2221/1654* (2013.01)

(58) Field of Classification Search
CPC ........... G03G 21/1633; G03G 21/1647; G03G 2221/1654; H04N 1/00551
See application file for complete search history.

(56) References Cited

U.S. PATENT DOCUMENTS

| 2010/0014129 | A1* | 1/2010 | Andoh | H04N 1/00519 358/498 |
| 2011/0293326 | A1* | 12/2011 | Tanabe | G03G 21/1633 399/124 |
| 2015/0130341 | A1* | 5/2015 | Azami | G03G 21/1623 312/333 |
| 2015/0132022 | A1* | 5/2015 | Masuda | G03G 21/1647 399/110 |
| 2017/0308029 | A1* | 10/2017 | Soda | B65H 1/266 |
| 2017/0315503 | A1* | 11/2017 | Maeda | G03G 21/1676 |
| 2018/0052419 | A1* | 2/2018 | Maeda | G03G 15/6502 |

FOREIGN PATENT DOCUMENTS

JP 2005-181453 A 7/2005

* cited by examiner

*Primary Examiner* — Rodney Bonnette
(74) *Attorney, Agent, or Firm* — Studebaker & Brackett PC

(57) ABSTRACT

A lock structure locks a document reader in a closed state relative to a main unit of an apparatus. The document reader is openable and closable relative to the main unit. The lock structure includes two engagement members, two hook members, and two restricting members. The two engagement members are disposed on the main unit. The two hook members are disposed on the document reader and engage with the two respective engagement members to secure the document reader in the closed state to the main unit. The two restricting members are disposed on the document reader and restrict move or pivot of the two respective hook members in a direction for the hook members to engage with the two respective engagement members when at least a portion of the document reader is open relative to the main unit. The two hook members are fixed to one another.

13 Claims, 20 Drawing Sheets

LOCK STRUCTURE AND IMAGE FORMING APPARATUS

INCORPORATION BY REFERENCE

The present application claims priority under 35 U.S.C. § 119 to Japanese Patent Application No. 2016-197127, filed on Oct. 5, 2016 and Japanese Patent Application No. 2017-140846, filed on Jul. 20, 2017. The contents of these applications are incorporated herein by reference in their entirety.

BACKGROUND

The present disclosure relates to lock structures and image forming apparatuses.

An openable cover locking mechanism includes an openable cover, a pair of locking pins, a reference hook member, a biasing member, a mating hook member, and a sensor. The openable cover pivots about a specific axis. The pair of locking pins are provided at opposite sides of a main unit of an apparatus. The reference hook member is swingably disposed on the openable cover and engages with one of the locking pins in a locked position. The biasing member biases the reference hook member toward the locked position. The mating hook member engages with the other locking pin in the locked position. The sensor detects the mating hook member positioned in the locked position. The main unit of the apparatus does not operate when the mating hook member is not in the locked position.

SUMMARY

A lock structure according to an aspect of the present disclosure locks an openable member in a closed state relative to a main unit of an apparatus. The openable member is openable and closable relative to the main unit. The lock structure includes a plurality of engagement members, a plurality of hook members, and a plurality of restricting members. The engagement members are disposed on the main unit. The hook members are disposed on the openable member. The hook members engage with the respective engagement members to secure the openable member in the closed state to the main unit. The restricting members are disposed on the openable member. The restricting members restrict move or pivot of the respective hook members in a direction for the hook members to engage with the respective engagement members when at least a portion of the openable member is open relative to the main unit. The hook members are fixed to one another.

An image forming apparatus according to another aspect of the present disclosure includes the above-described lock structure, an image forming device, a sensor, and a controller. The image forming device forms an image on a recording medium.

DETAILED DESCRIPTION

Figure 1:
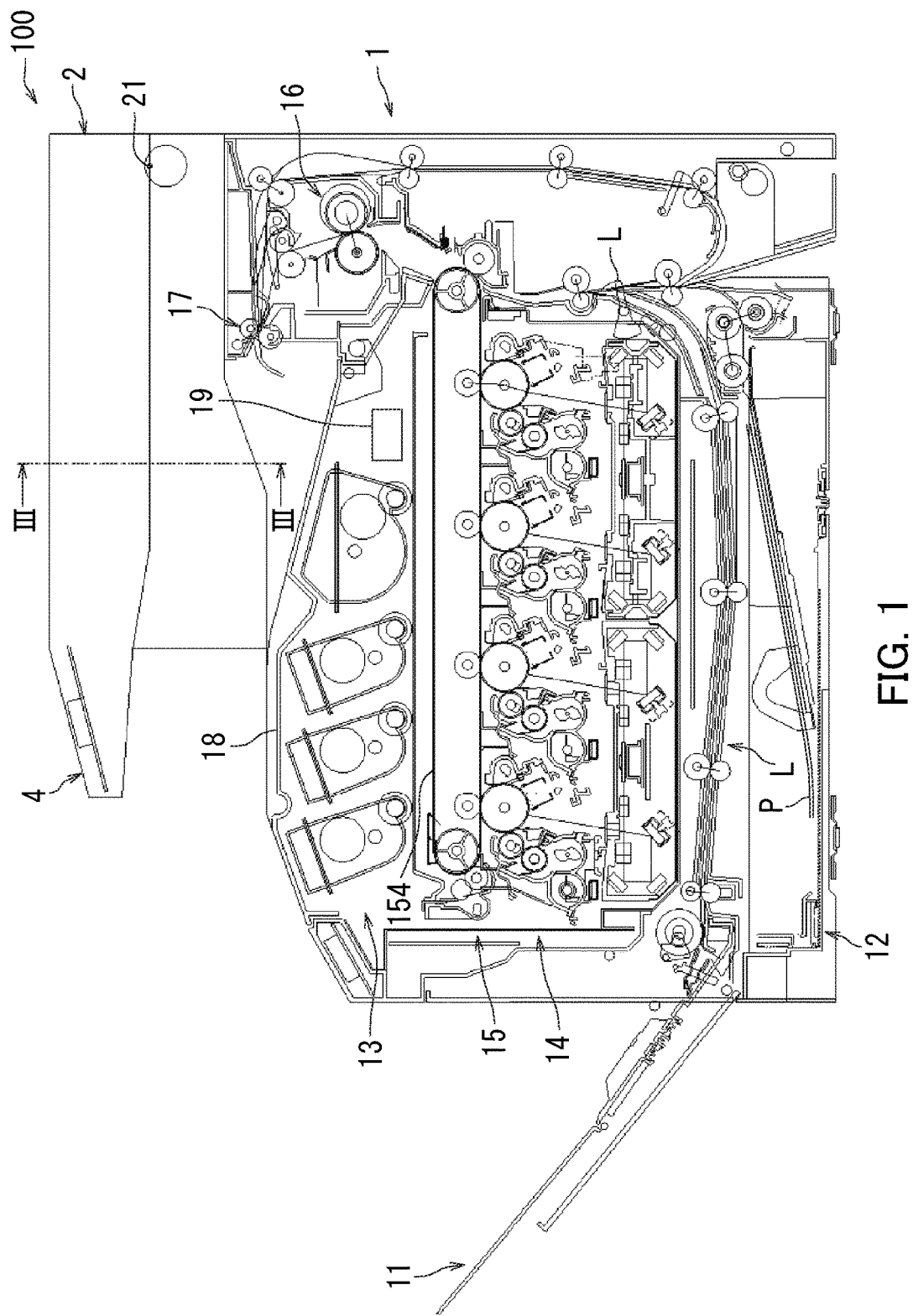
FIG. 1 is a side view illustrating a configuration of an image forming apparatus according to an embodiment of the present disclosure.

The following describes embodiments of the present disclosure with reference to the accompanying drawings (FIGS. 1 to 20B). Note that in the drawings, elements that are the same or equivalent are labelled using the same reference signs and description thereof will not be repeated.

Configuration Common to First and Second Embodiments

First, an image forming apparatus 100 according to an embodiment of the present disclosure will be described with reference to FIG. 1. FIG. 1 is a side view illustrating a configuration of the image forming apparatus 100. As illustrated in FIG. 1, the image forming apparatus 100 is a color multifunction peripheral. The image forming apparatus 100 includes a main unit 1, a document reader 2, and an operation panel 4.

The document reader 2 reads an image from a document. The document reader 2 has a rotational shaft 21. The rotational shaft 21 is disposed on a side distant from the operation panel 4. The document reader 2 is pivotable about the rotational shaft 21, and is openable and closable relative to the main unit 1. The document reader 2 is an example of what may be referred to as "an openable member". The operation panel 4 receives an operation by a user and displays various pieces of information.

The main unit 1 forms an image on paper P (a recording medium) by a so-called "electrographic method". The main unit 1 includes a manual feeder 11, a cassette feeder 12, a conveyance section L, a toner supply unit 13, an image forming device 14, a fixing section 16, an ejection section 17, an exit tray 18, and a controller 19. The image forming device 14 includes a transfer section 15.

The manual feeder 11 and the cassette feeder 12 feed the paper P to the conveyance section L. The conveyance section L conveys the paper P to the ejection section 17 via the transfer section 15 and the fixing section 16.

The toner supply unit 13 supplies toner to the image forming device 14. The image forming device 14 forms an image on the paper P.

The transfer section 15 includes an intermediate transfer belt 154. The image forming device 14 transfers cyan, magenta, yellow, and black toner images onto the intermediate transfer belt 154. The toner images of the different colors are superimposed on one another on the intermediate transfer belt 154 to form an image on the intermediate transfer belt 154. The transfer section 15 transfers the image from the intermediate transfer belt 154 to the paper P. As a result, the image is formed on the paper P.

After the image has been formed on the paper P, the fixing section 16 applies heat and pressure to the paper P to fix the image to the paper P. The ejection section 17 ejects the paper P onto the exit tray 18. The exit tray 18 receives the paper P ejected by the ejection section 17. The exit tray 18 also functions as a top cover of the main unit 1.

The controller 19 includes a processor and a storage section. The processor for example includes a central processing unit (CPU). The storage section includes memory such as semiconductor memory. The storage section may include a hard disk drive (HDD). A control program is stored in the storage section.

Figure 2A:
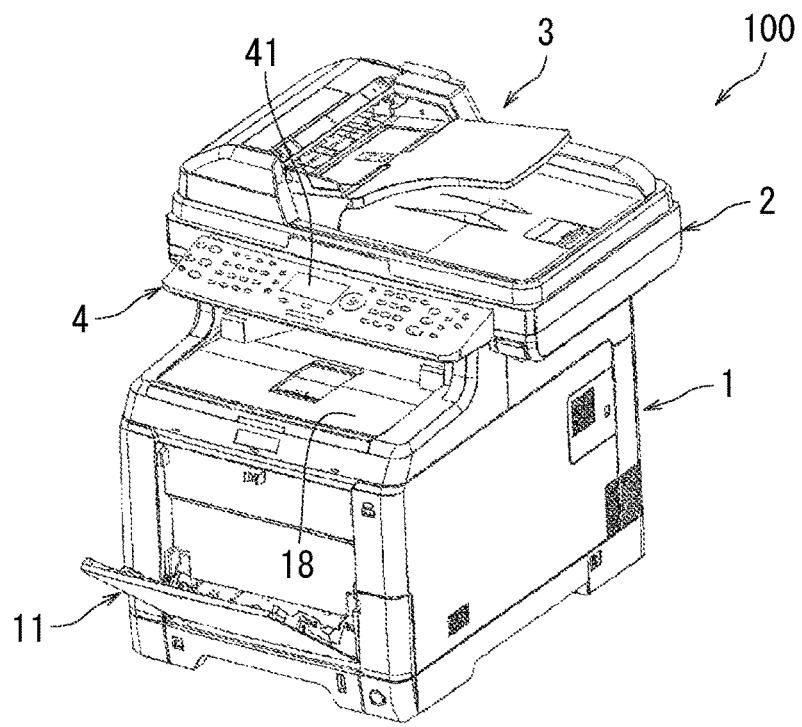
FIG. 2A is a perspective view illustrating external appearance of the image forming apparatus with a document reader closed relative to a main unit.
Figure 2B:
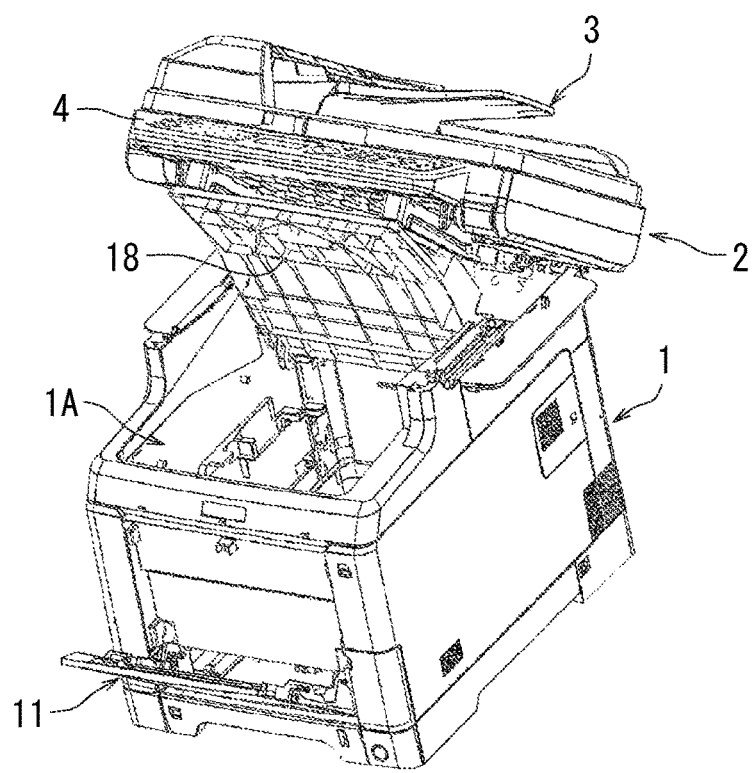
FIG. 2B is a perspective view illustrating external appearance of the image forming apparatus with the document reader open relative to the main unit.

The following further describes the configuration of the image forming apparatus 100 with reference to FIGS. 1, 2A, and 2B. FIG. 2A is a perspective view illustrating external appearance of the image forming apparatus 100 with the document reader 2 closed relative to the main unit 1. FIG. 2B is a perspective view illustrating external appearance of the image forming apparatus 100 with the document reader 2 open relative to the main unit 1.

As illustrated in FIG. 2A, the image forming apparatus 100 further includes a document feed unit 3. The document feed unit 3 feeds a document to the document reader 2. The operation panel 4 includes a touch panel 41. The touch panel 41 for example includes a liquid crystal display (LCD) and displays various images. The touch panel 41 further includes a touch sensor and receives an operation by a user. The touch panel 41 is an example of what may be referred to as a "display".

As illustrated in FIG. 2B, the main unit 1 further includes an opening 1A. The opening 1A is opened when a toner cartridge of the toner supply unit 13 is attached or detached. More specifically, the document reader 2 is pivotable about the rotational shaft 21 (see FIG. 1) disposed on the side distant from the operation panel 4, and is openable and closable relative to the main unit 1. The exit tray 18 pivots in the same direction as the document reader 2 and opens the opening 1A in conjunction with the document reader 2 shifting from a closed state to an open state relative to the main unit 1.

When closing the opening 1A, the exit tray 18 functions as the top cover of the main unit 1 as illustrated in FIG. 2A. The exit tray 18 pivots in the same direction as the document reader 2 and closes the opening 1A of the main unit 1 in conjunction with the document reader 2 shifting from the open state to the closed state.

First Embodiment

Figure 3:
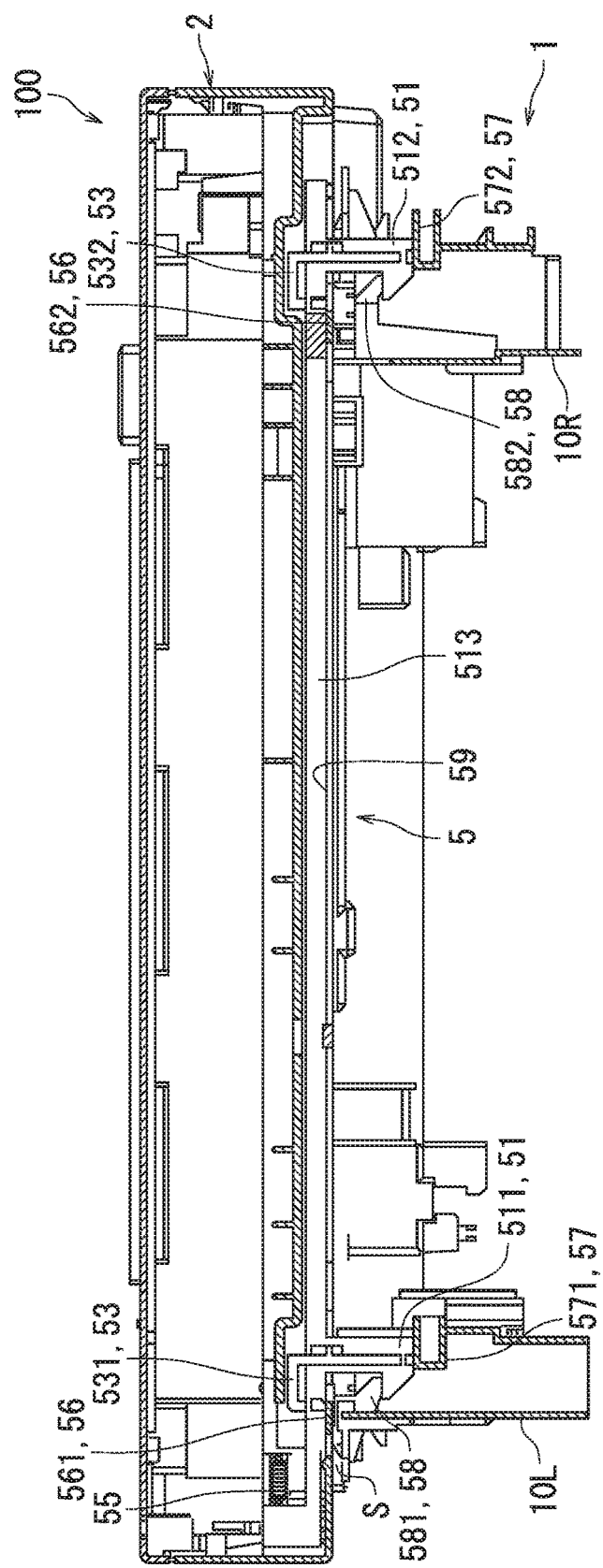
FIG. 3 is a cross-sectional view of a lock structure according to a first embodiment of the present disclosure.
Figure 4:
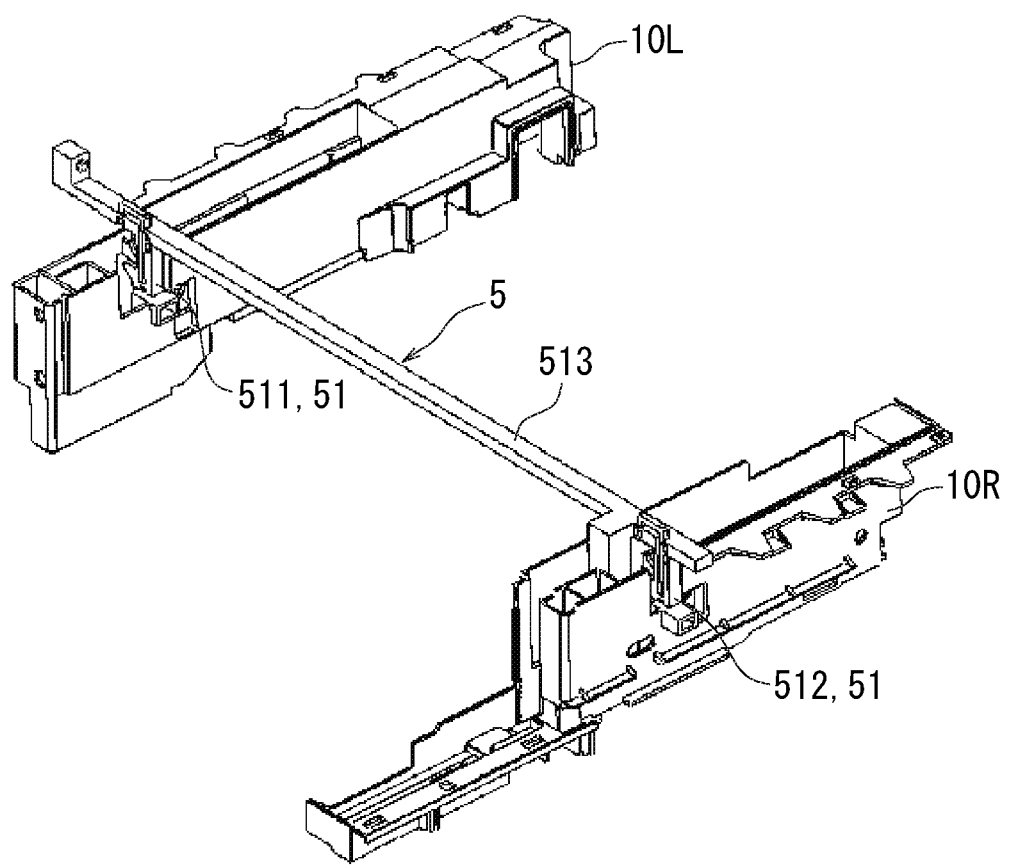
FIG. 4 is a perspective view of the lock structure.

The following describes a lock structure 5 according to the first embodiment of the present disclosure with reference to FIGS. 1 to 4. FIG. 3 is a cross-sectional view of the lock structure 5 taken along line III-III in FIG. 1. FIG. 4 is a perspective view of the lock structure 5.

Note that the document feed unit 3 is not shown in FIG. 3. As illustrated in FIG. 3, the image forming apparatus 100 includes a sensor S and the lock structure 5. The sensor S detects the open state and the closed state of the document reader 2. More specifically, the sensor S is disposed at an upper end of the main unit 1 and detects pressure applied by a lower end of the document reader 2. A detection signal from the sensor S is transmitted to the controller 19.

When the sensor S detects the closed state of the document reader 2, the controller 19 allows operation of the image forming device 14. The term "operation of the image forming device 14" refers to operation for forming an image on the paper P. On the other hand, when the sensor S detects the open state of the document reader 2, the controller 19 inhibits operation of the image forming device 14. That is, the controller 19 controls the image forming device 14 so that the image forming device 14 does not operate. When the sensor S detects the open state of the document reader 2, the controller 19 also displays on the touch panel 41 information indicating that operation of the image forming device 14 is being inhibited. For example, the controller 19 displays on the touch panel 41 a message that reads: "The document reader is open, and printing is inexecutable".

As described above, the single sensor S detects the open state and the closed state of the document reader 2. According to the first embodiment, the document reader 2 is prevented from being locked only at one side thereof and left open at the other side ("one-side closing"). Therefore, the open state and the closed state of the document reader 2 can be correctly detected with the single sensor S. The controller 19 allows operation of the image forming device 14 when the sensor S detects the closed state of the document reader 2. Therefore, the image forming device 14 can operate to form an image on the paper P when the document reader 2 is in the closed state.

The controller 19 inhibits operation of the image forming device 14 and displays on the touch panel 41 information indicating that operation of the image forming device 14 is being inhibited, when the sensor S detects the open state of the document reader 2. Thus, the image forming device 14 can be inhibited from operating when the document reader 2 is in the open state. Since the controller 19 displays on the touch panel 41 information indicating that operation of the image forming device 14 is being inhibited, the user can recognize that the document reader 2 is not in the closed state.

The lock structure 5 locks the document reader 2 in the closed state relative to the main unit 1. The lock structure 5 includes a plurality of engagement members 58, a plurality of hook members 51, a second biasing member 55, a plurality of move restricting members 53, a plurality of unrestricting members 57, and a supporting member 59. In the first embodiment, the term "a plurality of members" refers to two members. As illustrated in FIG. 4, the main unit 1 includes coupling sections 10R and 10L located opposite to the respective hook members 51. The coupling sections 10R and 10L are located at the upper end of the main unit 1 and couple the document reader 2 to the main unit 1 through the lock structure 5. The move restricting members 53 are an example of what may be referred to as "restricting members".

The engagement members 58 are disposed on the main unit 1. The engagement members 58 engage with the respective hook members 51. The engagement members 58 include an engagement member 581 and an engagement member 582. The engagement member 581 is disposed on the coupling section 10L, and the engagement member 582 is disposed on the coupling section 10R.

The hook members 51 are disposed on the document reader 2. The hook members 51 engage with the respective engagement members 58 thereby to secure (lock) the document reader 2 in the closed state to the main unit 1. The hook members 51 are arranged in a line substantially parallel to the rotational shaft 21 (see FIG. 1). The hook members 51 include a hook member 511 and a hook member 512. The hook member 511 engages with the engagement member 581, and the hook member 512 engages with the engagement member 582.

The hook members 51 are fixed to one another. More specifically, the lock structure 5 further includes a coupling member 513 as illustrated in FIG. 4. The coupling member 513 couples the hook member 511 and the hook member 512 together. The coupling member 513 has a columnar shape and extends substantially in parallel to the rotational shaft 21.

As described above, the document reader 2 has the rotational shaft 21, which functions as a pivot of the opening and closing movement of the document reader 2, and the hook members 51 are arranged in a line substantially parallel to the rotational shaft 21. Accordingly, the plurality of hook members 51 can be fixed to one another through a simple configuration in which the adjacent hook members 511 and 512 are coupled together by for example the coupling member 513 extending substantially in parallel to the rotational shaft 21.

The move restricting members 53 are disposed on the document reader 2. The move restricting members 53 are arranged in one-to-one correspondence with the hook members 51. When at least a portion of the document reader 2 is open relative to the main unit 1, the move restricting members 53 restrict move of the respective hook members 51 in a direction for the hook members 51 to engage with the respective engagement members 58. The direction for the hook members 51 to engage with the respective engagement members 58 is a leftward direction in FIG. 3. More specifically, the move restricting members 53 include a move restricting member 531 and a move restricting member 532. The move restricting members 53 are movable in directions away from and toward the document reader 2. In FIG. 3, the direction away from the document reader 2 is an upward direction, and the direction toward the document reader 2 is a downward direction. More specifically, each of the move restricting members 53 is slidable in a guide groove. The guide grooves are formed in the respective hook members 51 and elongated in an up-down direction.

The supporting member 59 supports the coupling member 513 such that the coupling member 513 is slidable. Thus, the hook members 51 slide on the supporting member 59 to move in a direction toward the respective engagement members 58 or in a direction away from the respective engagement members 58. In FIG. 3, the direction toward the respective engagement members 58 is the leftward direction, and the direction away from the respective engagement members 58 is a rightward direction.

The supporting member 59 has a plurality of contact sections 56. When the document reader 2 is in the open state, the move restricting members 53 are in contact with the respective contact sections 56, restricting move of the hook members 51 in the direction toward the respective engagement members 58. More specifically, the contact sections 56 include a contact section 561 and a contact section 562. When the document reader 2 is in the open state, the move restricting member 531 is in contact with the contact section 561, restricting move of the hook member 511 in the direction toward the engagement member 581. Likewise, when the document reader 2 is in the open state, the move restricting member 532 is in contact with the contact section 562, restricting move of the hook member 512 in the direction toward the engagement member 582.

Thus, the move restricting members 53 are arranged in one-to-one correspondence with the hook members 51. Accordingly, the move restricting members 53 restrict move of the respective hook members 51 depending on whether or not each of the hook members 51 is in a position engageable with a corresponding one of the engagement members 58. Accordingly, when at least one of the hook members 51 is not in the position engageable with the corresponding engagement member 58, move of the plurality of hook members 51 is restricted. As a result, occurrence of the "one-side closing" can be prevented more reliably even if a twisting occurs in the document reader 2 in the course of manufacture thereof.

When at least one side of the document reader 2 is open, at least one of the move restricting members 53 is in contact with a corresponding one of the contact sections 56. Thus, move of the plurality of hook members 51 is restricted. As a result, all of the hook members 51 are prevented from engaging with the respective engagement members 58. Thus, occurrence of the "one-side closing" can be prevented more reliably even if a twisting occurs in the document reader 2.

The unrestricting members 57 are disposed on the main unit 1. The unrestricting members 57 remove restriction of move of the hook members 51 by the move restricting members 53. The move restricting members 53 are arranged at positions in one-to-one correspondence with the hook members 51. More specifically, when the document reader 2 shifts from the open state to the closed state, the move restricting members 53 come in contact with the respective unrestricting members 57, and the unrestricting members 57 remove restriction of move of the respective hook members 51. More specifically, the unrestricting members 57 include an unrestricting member 571 and an unrestricting member 572. When the document reader 2 shifts from the open state to the closed state, the move restricting member 531 comes in contact with the unrestricting member 571, and the unrestricting member 571 removes restriction of move of the hook member 511. Likewise, when the document reader 2 shifts from the open state to the closed state, the move restricting member 532 comes in contact with the unrestricting member 572, and the unrestricting member 572 removes restriction of move of the hook member 512.

As described above, the unrestricting members 57 remove restriction of move of the respective hook members 51 by the respective move restricting members 53. Accordingly, when all of the unrestricting members 57 have removed restriction of move of all of the hook members 51, all of the hook members 51 engage with (lock) the respective engagement members 58. When at least one of the unrestricting members 57 has not removed restriction of move of a corresponding one of the hook members 51, move of all of the hook members 51 is kept restricted. As a result, all of the hook members 51 are prevented from engaging with the respective engagement members 58. Thus, occurrence of the "one-side closing" can be prevented reliably even if a twisting occurs in the document reader 2.

Furthermore, when the document reader 2 shifts from the open state to the closed state, each of the move restricting members 53 comes in contact with a corresponding one of the unrestricting members 57. As a result, each of the unrestricting members 57 removes restriction of move of a corresponding one of the hook members 51. Thus, the unrestricting members 57 can be implemented through a simple configuration.

The second biasing member 55 biases a group of the hook member 511, the hook member 512, and the coupling member 513 in the direction for the hook member 511 to engage with the engagement member 581. The direction for the hook member 511 to engage with the engagement member 581 is the leftward direction in FIG. 3. The direction for the hook member 511 to engage with the engagement member 581 is the same as the direction for the hook member 512 to engage with the engagement member 582.

When the unrestricting members 57 have removed restriction of move of the respective hook members 51, the second biasing member 55 biases the hook member 511, the hook member 512, and the coupling member 513 in the direction for the hook member 511 to engage with the engagement member 581. As a result, the group of the hook member 511, the hook member 512, and the coupling member 513 slides on the supporting member 59 in the leftward direction in FIG. 3, and thus the hook member 511 engages with the engagement member 581 and the hook member 512 engages with the engagement member 582.

According to the lock structure 5 of the first embodiment, as described above with reference to FIGS. 1 to 4, the hook members 51 are fixed to one another. When the document reader 2 is open relative to the main unit 1, the move restricting members 53 restrict move of the respective hook members 51 in the direction for the hook members 51 to engage with the respective engagement members 58. Accordingly, when at least one side of the document reader 2 is open relative to the main unit 1, at least one of the move restricting members 53 restricts move of the corresponding hook member 51 in the direction for the hook member 51 to engage with the corresponding engagement member 58. As a result, all of the hook members 51 are prevented from engaging with the respective engagement members 58. Thus, occurrence of the "one-side closing" can be prevented even if a twisting occurs in the document reader 2.

The document reader 2 is openable and closable relative to the main unit 1. According to the lock structure 5 of the first embodiment, the "one-side closing" is prevented from occurring when the document reader 2 is opened or closed relative to the main unit 1. Therefore, it is not necessary to take measures to prevent occurrence of the "one-side closing" before shipment of the image forming apparatus 100, reducing production costs of the image forming apparatus 100.

Figure 5:
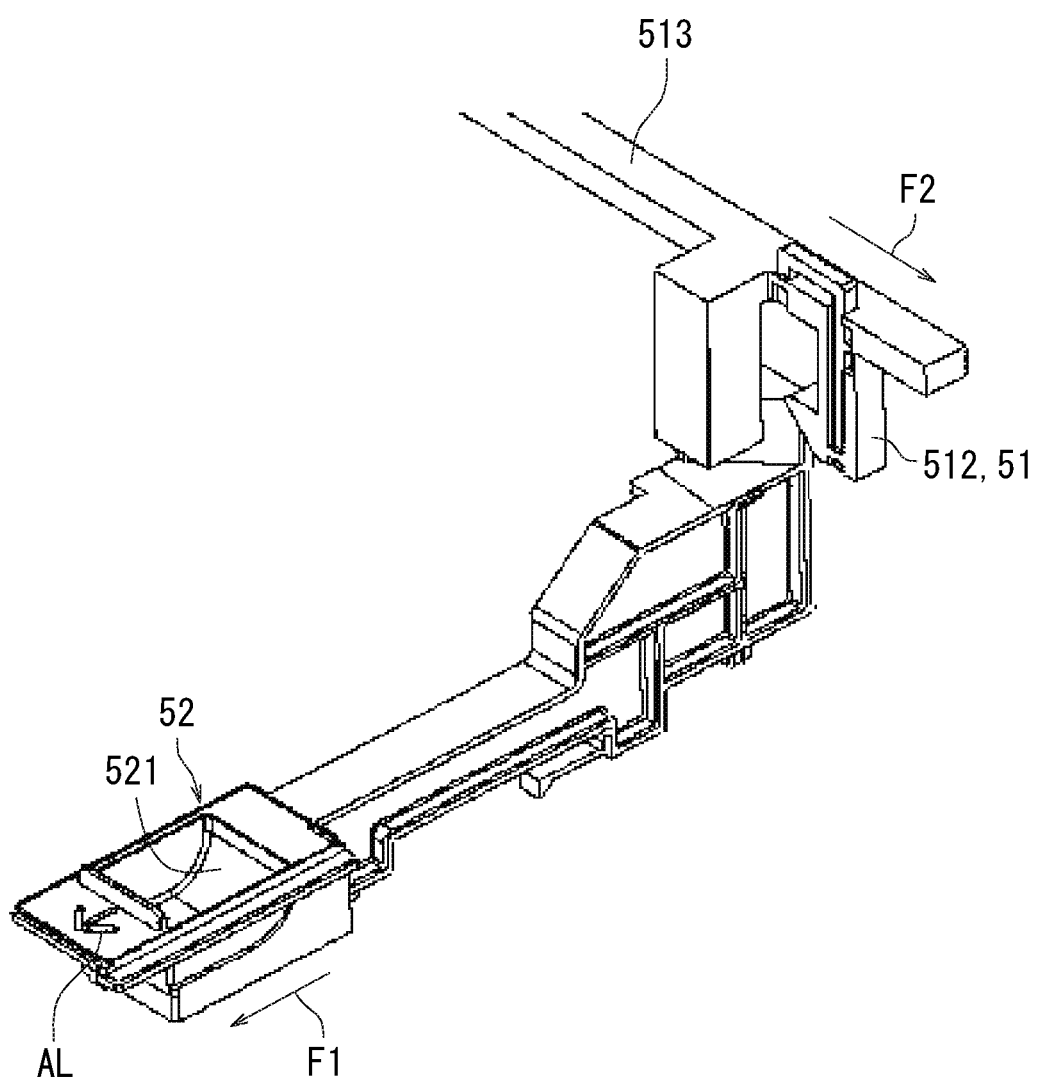
FIG. 5 is a perspective view of an unlocking lever.
Figure 6:
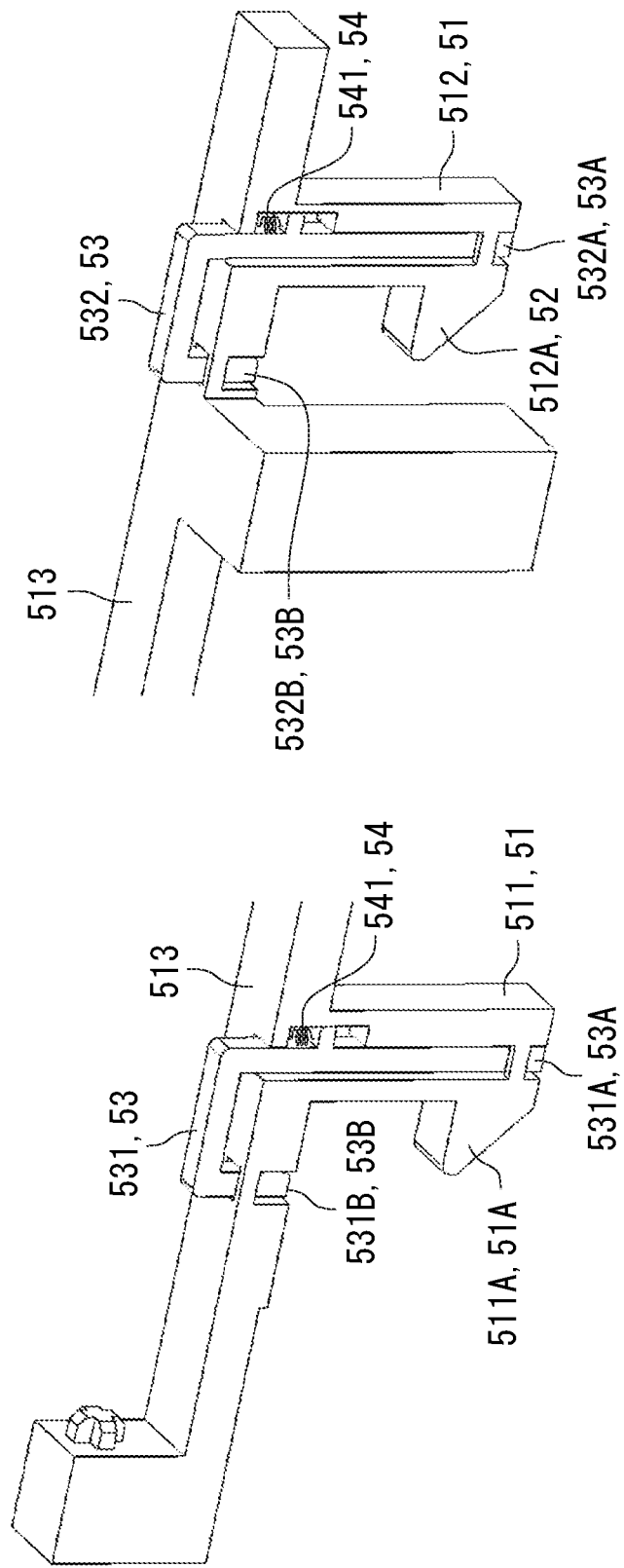
FIG. 6A is a perspective view of one of hook members.
FIG. 6B is a perspective view of the other of the hook members.

The following describes an unlocking lever 52 with reference to FIGS. 1 to 5. FIG. 5 is a perspective view of the unlocking lever 52. The lock structure 5 further has the unlocking lever 52. A user operates the unlocking lever 52 for unlocking the document reader 2 relative to the main unit 1.

The unlocking lever 52 has a recess 521 and an arrow icon AL. The user unlocks the document reader 2 by positioning a finger in the recess 521 and pulling the recess 521 in a direction F1 indicated by the arrow icon AL. More specifically, a move of the recess 521 in the direction F1 causes the group of the hook member 511, the hook member 512, and the coupling member 513 to move in a direction F2 through a linkage mechanism. As a result, the hook member 511 disengages from the engagement member 581, and the hook member 512 disengages from the engagement member 582. Thus, the document reader 2 is unlocked relative to the main unit 1.

According to the lock structure 5 of the first embodiment, as described above with reference to FIGS. 1 to 5, the document reader 2 is unlocked relative to the main unit 1 by a user pulling the unlocking lever 52 in the direction F1.

The following further describes the configuration of the lock structure 5 with reference to FIGS. 1 to 4, 6A, and 6B. FIG. 6A is a perspective view of the hook member 511. FIG. 6B is a perspective view of the hook member 512. As illustrated in FIGS. 6A and 6B, the lock structure 5 further includes a plurality of first biasing members 54.

Each of the move restricting members 53 is substantially J-shaped and has one side end 53A and an opposite side end 53B. More specifically, the move restricting member 531 has one side end 531A and an opposite side end 531B, and the move restricting member 532 has one side end 532A and an opposite side end 532B.

The first biasing members 54 bias the respective move restricting members 53 in a downward direction such that the one side end 53A of each of the move restricting members 53 protrudes downward from a lower end of a corresponding one of the hook members 51. More specifically, the first biasing members 54 include a first biasing member 541 and a first biasing member 542. The first biasing member 541 biases the move restricting member 531 in the downward direction such that the one side end 531A protrudes downward from the lower end of the hook member 511. Likewise, the first biasing member 542 biases the move restricting member 532 in the downward direction such that the one side end 532A protrudes downward from the lower end of the hook member 512.

When the document reader 2 shifts from the open state to the closed state, the one side end 53A of each of the move restricting members 53 comes in contact with a corresponding one of the unrestricting members 57. Then, each of the unrestricting members 57 pushes the one side end 53A of a corresponding one of the move restricting members 53 in the upward direction to remove restriction of move of a corresponding one of the hook members 51. More specifically, when the document reader 2 shifts from the open state to the closed state, the one side end 531A of the move restricting member 531 comes in contact with the unrestricting member 571. Then, the unrestricting member 571 pushes the one side end 531A of the move restricting member 531 in the upward direction to remove restriction of move of the hook member 511. Likewise, when the document reader 2 shifts from the open state to the closed state, the one side end 532A of the move restricting member 532 comes in contact with the unrestricting member 572. Then, the unrestricting member 572 pushes the one side end 532A of the move restricting member 532 in the upward direction to remove restriction of move of the hook member 512.

According to the lock structure 5 of the first embodiment, as described above with reference to FIGS. 1 to 4, 6A, and 6B, the first biasing members 54 bias the respective move restricting members 53 in the downward direction such that the one side end 53A of each of the move restricting members 53 protrudes downward from the lower end of a corresponding one of the hook members 51. When the document reader 2 shifts from the open state to the closed state, the one side end 53A of each of the move restricting members 53 comes in contact with a corresponding one of the unrestricting members 57. Then, each of the unrestricting members 57 pushes the one side end 53A of a corresponding one of the move restricting members 53 in the upward direction to remove restriction of move of a corresponding one of the hook members 51. Thus, the move restricting members 53 and the unrestricting members 57 can be implemented through a simple configuration.

The following describes operation of the lock structure 5 with reference to FIGS. 1 to 4 and 7 to 10B.

Figure 7:
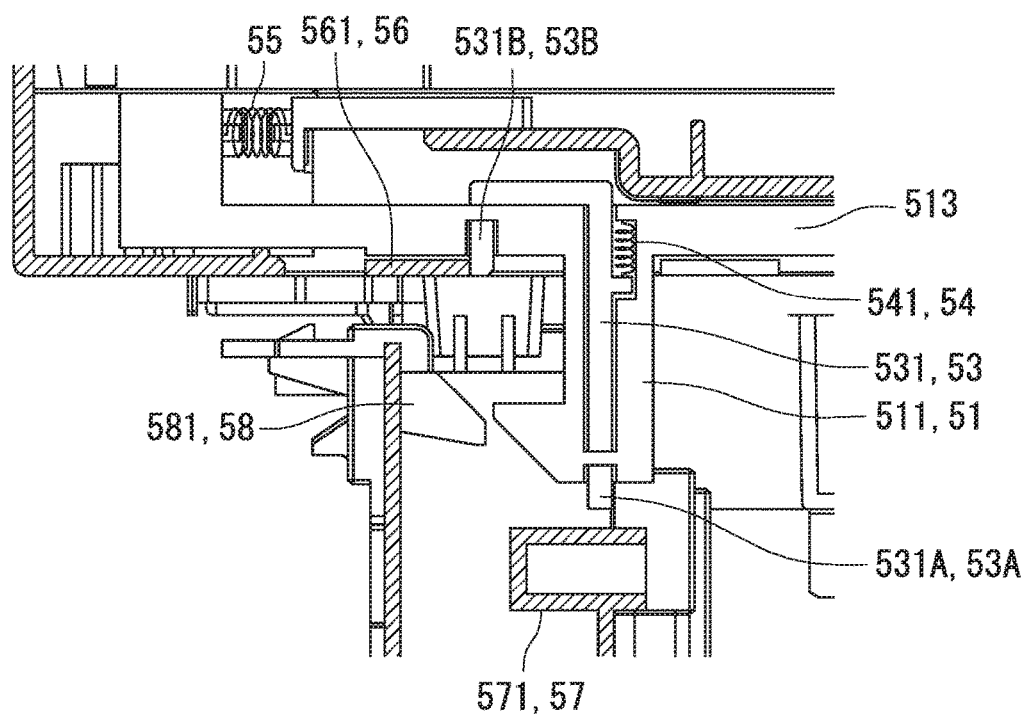
FIG. 7 is a cross-sectional view illustrating a disengaged state of the one hook member and a corresponding one of engagement members.
Figure 8A:
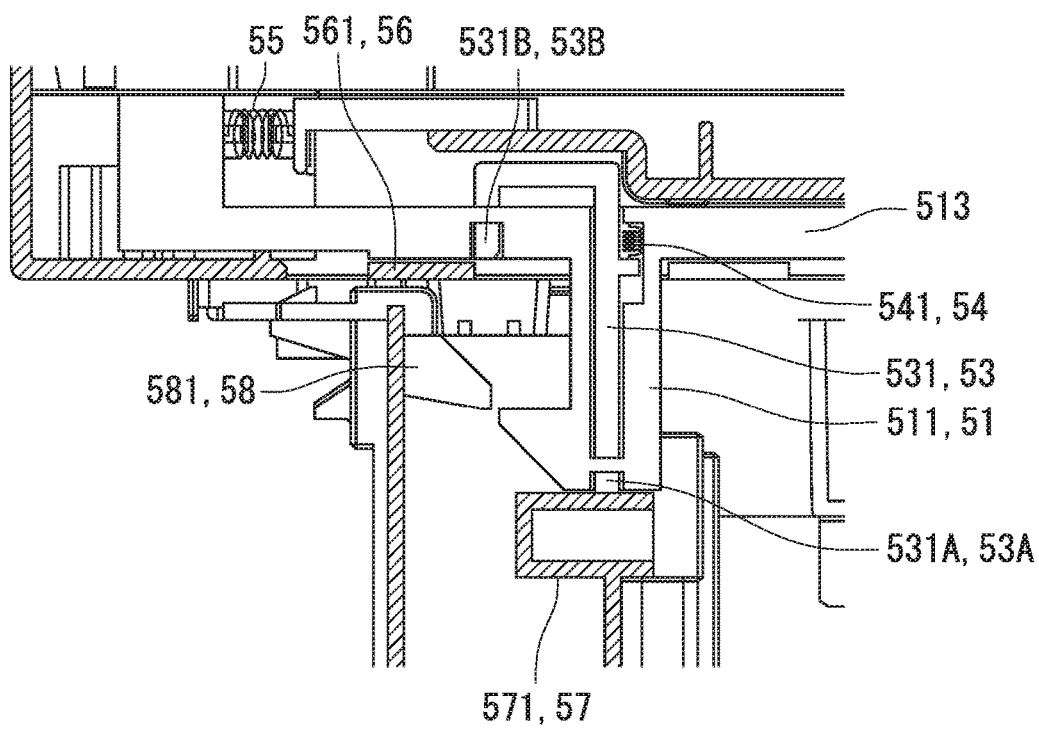
FIG. 8A is a cross-sectional view illustrating a move unrestricted state of the one hook member.
Figure 8B:
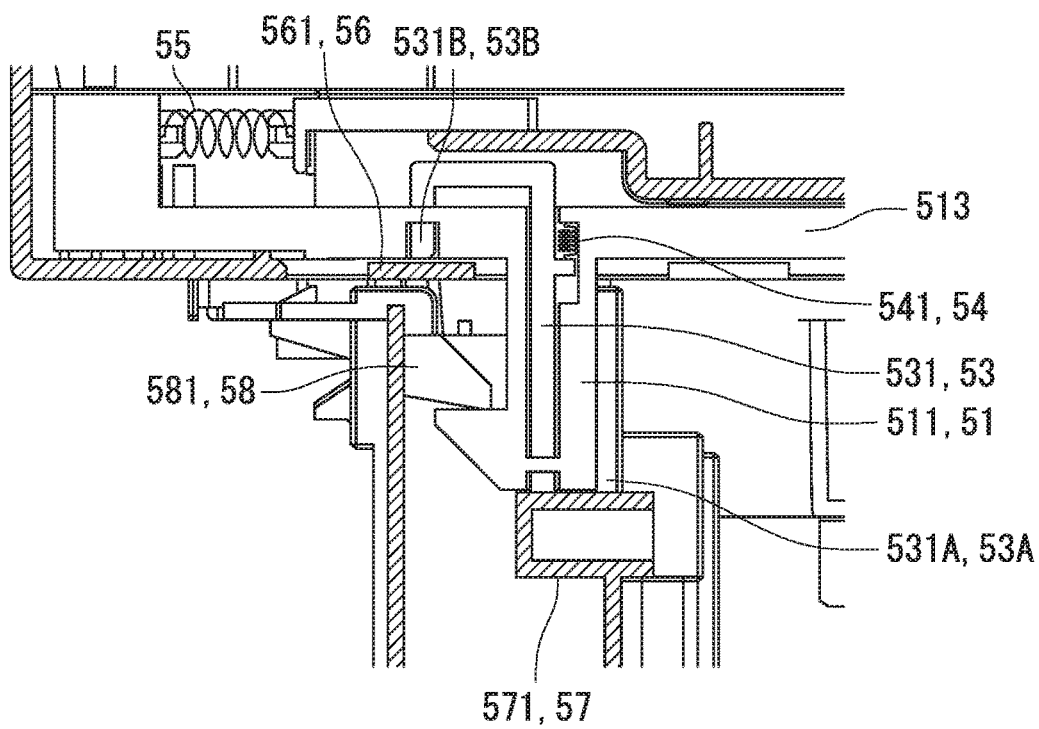
FIG. 8B is a cross-sectional view illustrating an engaged state of the one hook member and the corresponding engagement member.

The following first describes operation of the lock structure 5 corresponding to a shift of the hook member 511 and the engagement member 581 from a disengaged state to an engaged state with reference to FIGS. 7, 8A, and 8B. FIG. 7 is a cross-sectional view illustrating the disengaged state of the hook member 511 and the engagement member 581. FIG. 8A is a cross-sectional view illustrating a move unrestricted state of the hook member 511. FIG. 8B is a cross-sectional view illustrating the engaged state of the hook member 511 and the engagement member 581.

As illustrated in FIG. 7, the one side end 531A is spaced from the unrestricting member 571. Accordingly, the move restricting member 531 is not pushed in the upward direction by the unrestricting member 571. The first biasing member 541 biases the move restricting member 531 in the downward direction such that the one side end 531A protrudes downward from the lower end of the hook member 511. Accordingly, the one side end 531A protrudes downward from the lower end of the hook member 511. The opposite side end 531B is in contact with the contact section 561. Thus, the move restricting member 531 restricts move of the hook member 511 in the direction for the hook member 511 to engage with the engagement member 581. The direction for the hook member 511 to engage with the engagement member 581 is a leftward direction in FIG. 7.

Next, as illustrated in FIG. 8A, the one side end 531A comes in contact with the unrestricting member 571. Accordingly, the move restricting member 531 is pushed in the upward direction by the unrestricting member 571 against biasing force of the first biasing member 541. As a result, the one side end 531A moves upward to be flush with the lower end of the hook member 511. Along therewith, the opposite side end 531B moves upward to a position higher than an upper face of the contact section 561. Thus, restriction of move of the hook member 511 in the direction for the hook member 511 to engage with the engagement member 581 by the move restricting member 531 is removed.

Next, as illustrated in FIG. 8B, the hook member 511 moves in the direction for the hook member 511 to engage with the engagement member 581 (in the leftward direction) so long as restriction of move of the hook member 512 has also been removed. As a result, the hook member 511 engages with the engagement member 581. When restriction of move of the hook member 512 has not been removed, move of the hook member 511 in the direction for the hook member 511 to engage with the engagement member 581 is kept restricted, because the hook member 511, the hook member 512, and the coupling member 513 are fixed to one another.

Figure 9:
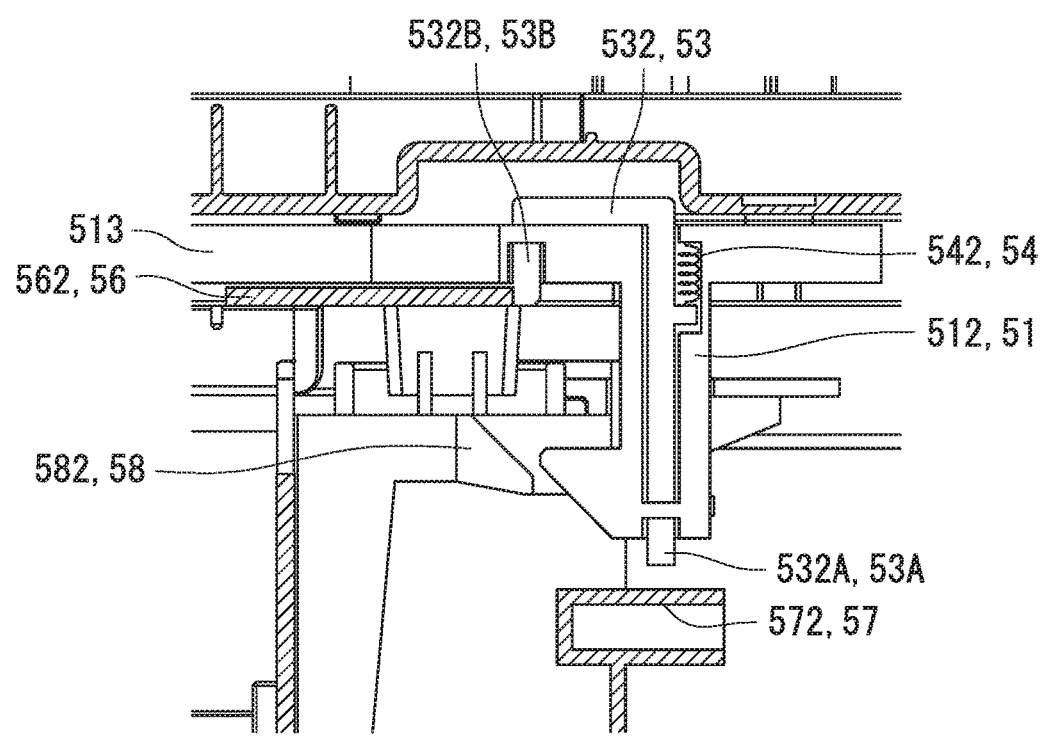
FIG. 9 is a cross-sectional view illustrating a disengaged state of the other hook member and a corresponding one of the engagement members.
Figure 10A:
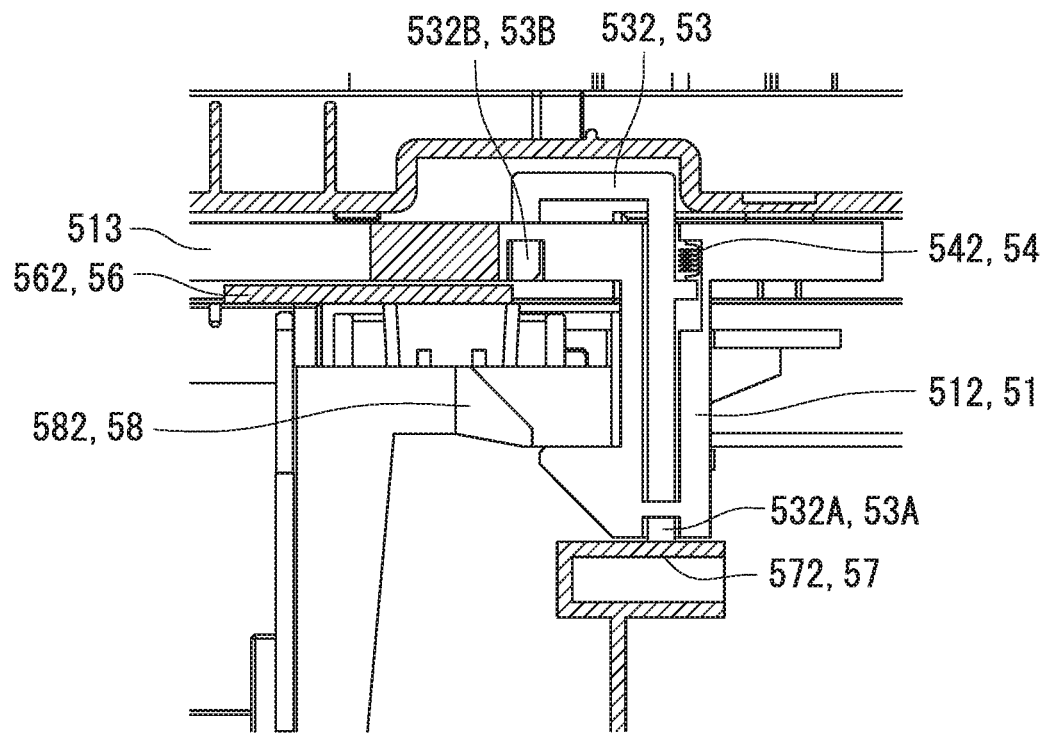
FIG. 10A is a cross-sectional view illustrating a move unrestricted state of the other hook member.
Figure 10B:
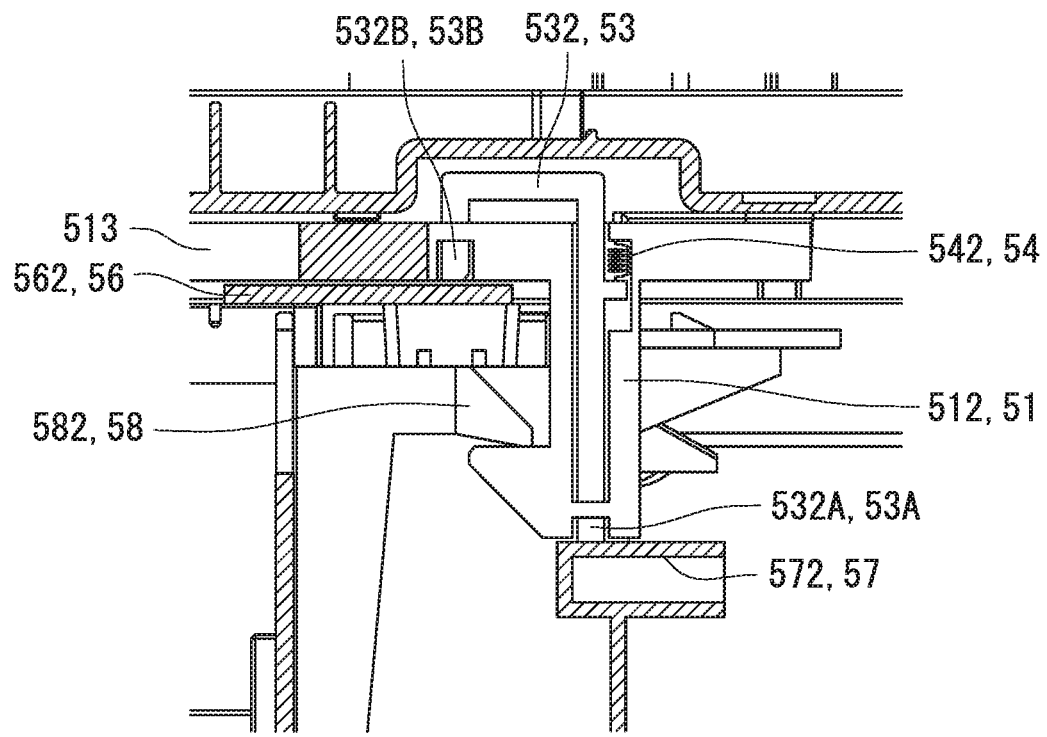
FIG. 10B is a cross-sectional view illustrating an engaged state of the other hook member and the corresponding engagement member.

The following describes operation of the lock structure 5 corresponding to a shift of the hook member 512 and the engagement member 582 from a disengaged state to an engaged state with reference to FIGS. 9, 10A, and 10B. FIG. 9 is a cross-sectional view illustrating the disengaged state of the hook member 512 and the engagement member 582. FIG. 10A is a cross-sectional view illustrating a move unrestricted state of the hook member 512. FIG. 10B is a cross-sectional view illustrating the engaged state of the hook member 512 and the engagement member 582.

As illustrated in FIG. 9, the one side end 532A is spaced from the unrestricting member 572. Accordingly, the move restricting member 532 is not pushed in the upward direction by the unrestricting member 572. The first biasing member 542 biases the move restricting member 532 in the downward direction such that the one side end 532A protrudes downward from the lower end of the hook member 512. Accordingly, the one side end 532A protrudes downward from the lower end of the hook member 512. The opposite side end 532B is in contact with the contact section 562. Thus, the move restricting member 532 restricts move of the hook member 512 in the direction for the hook member 512 to engage with the engagement member 582. The direction for the hook member 512 to engage with the engagement member 582 is a leftward direction in FIG. 9.

Next, as illustrated in FIG. 10A, the one side end 532A comes in contact with the unrestricting member 572. Accordingly, the move restricting member 532 is pushed in the upward direction by the unrestricting member 572 against biasing force of the first biasing member 542. As a result, the one side end 532A moves upward to be flush with the lower end of the hook member 512. Along therewith, the opposite side end 532B moves upward to a position higher than an upper face of the contact section 562. Thus, restriction of move of the hook member 512 in the direction for the hook member 512 to engage with the engagement member 582 (in the leftward direction) by the move restricting member 532 is removed.

Next, as illustrated in FIG. 10B, the hook member 512 moves in the direction for the hook member 512 to engage with the engagement member 582 (in the leftward direction) so long as restriction of move of the hook member 511 has also been removed. As a result, the hook member 512 engages with the engagement member 582. When restriction of move of the hook member 511 has not been removed, move of the hook member 512 in the direction for the hook member 512 to engage with the engagement member 582 is kept restricted, because the hook member 511, the hook member 512, and the coupling member 513 are fixed to one another.

According to the lock structure 5 of the first embodiment, as described above with reference to FIGS. 1 to 4 and 7 to 10B, the document reader 2 shifts from the open state to the closed state relative to the main unit 1 as a result of both the hook member 511 and the hook member 512 engaging with the engagement member 581 and the engagement member 582, respectively. Thus, occurrence of the "one-side closing" can be prevented.

Figure 11:
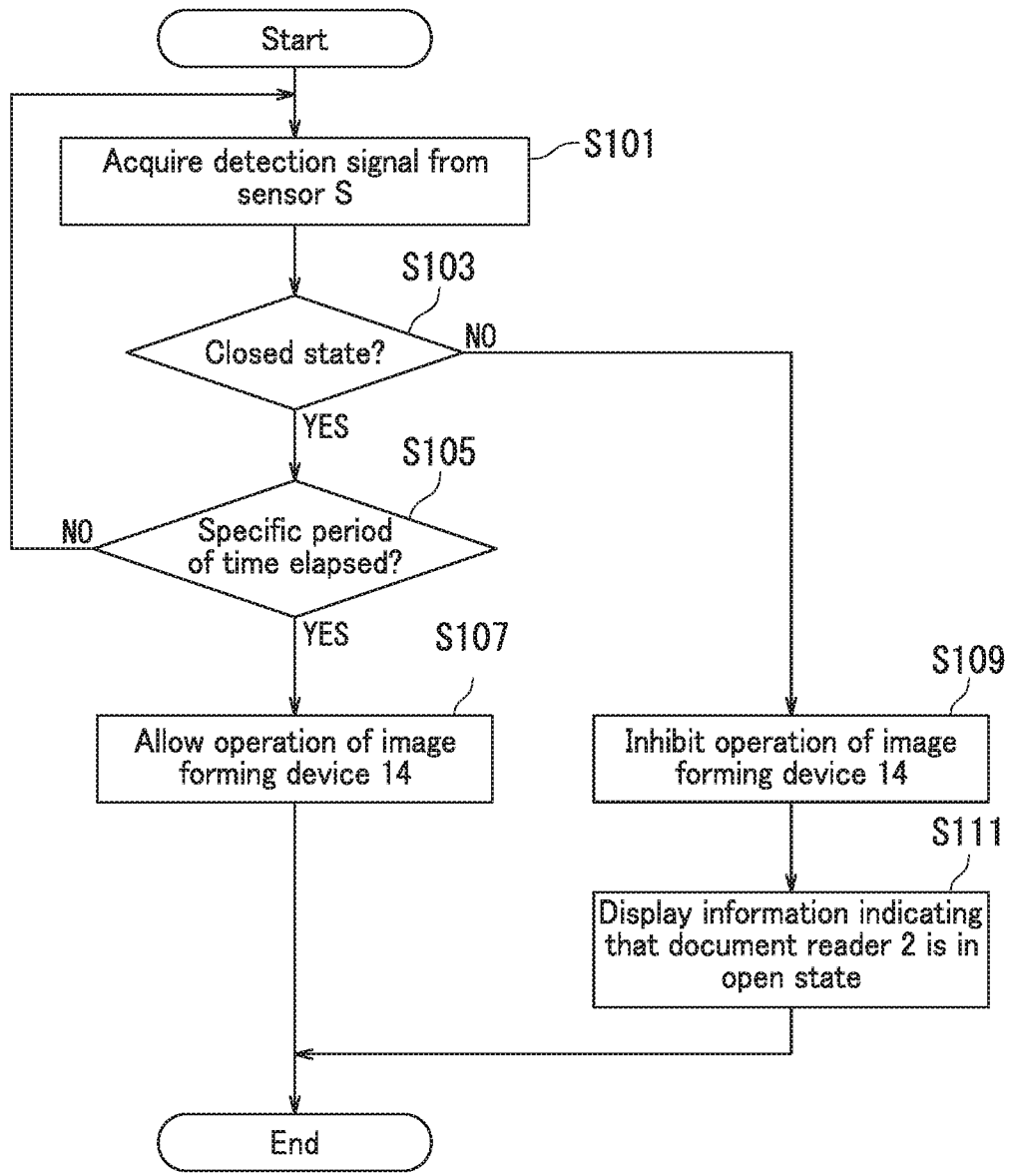
FIG. 11 is a flowchart illustrating a process performed by a controller.

The following describes a process performed by the controller 19 with reference to FIGS. 1 to 4 and 11. FIG. 11 is a flowchart illustrating a process performed by the controller 19.

First, in Step S101, the controller 19 acquires a detection signal from the sensor S.

Next, in Step S103, the controller 19 determines whether or not the document reader 2 is in the closed state.

Upon the controller 19 determining that the document reader 2 is not in the closed state (NO in Step S103), the process proceeds to Step S109. Upon the controller 19 determining that the document reader 2 is in the closed state (YES in Step S103), the process proceeds to Step S105.

In Step S105, the controller 19 determines whether or not a specific period of time has elapsed. The "specific period of time" is for example five seconds.

Upon the controller 19 determining that the specific period of time has not elapsed (NO in Step S105), the process returns to Step S101. Upon the controller 19 determining that the specific period of time has elapsed (YES in Step S105), the process proceeds to Step S107.

In Step S107, the controller 19 allows operation of the image forming device 14, and the process comes to an end.

If the result of the determination is NO in Step S103, the controller 19 inhibits operation of the image forming device 14 in Step S109. That is, the controller 19 controls the image forming device 14 so that the image forming device 14 does not operate.

Next, in Step S111, the controller 19 displays on the touch panel 41 information indicating that the document reader 2 is in the open state, and the process comes to an end.

According to the image forming apparatus 100 of the first embodiment, as described above with reference to FIGS. 1 to 4 and 11, the controller 19 allows operation of the image forming device 14 only when the document reader 2 is kept in the closed state for at least the specific period of time. That is, even if the sensor S detects a short-term closed state, the controller 19 does not allow operation of the image forming device 14. Thus, the image forming device 14 is allowed to operate only when the document reader 2 is in a reliable closed state.

Second Embodiment

Figure 12:
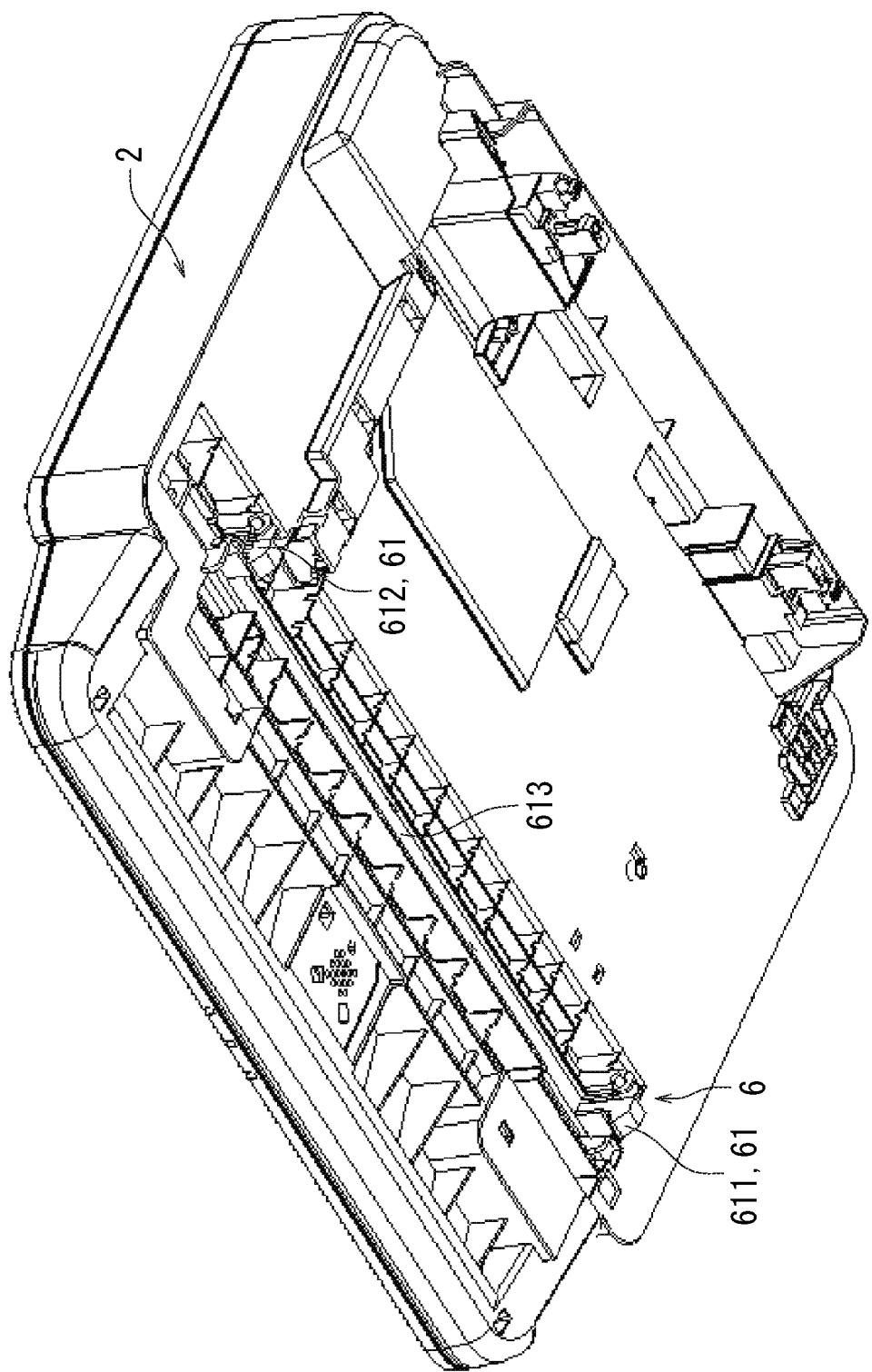
FIG. 12 is a perspective view illustrating external appearance of the document reader.
Figure 13:
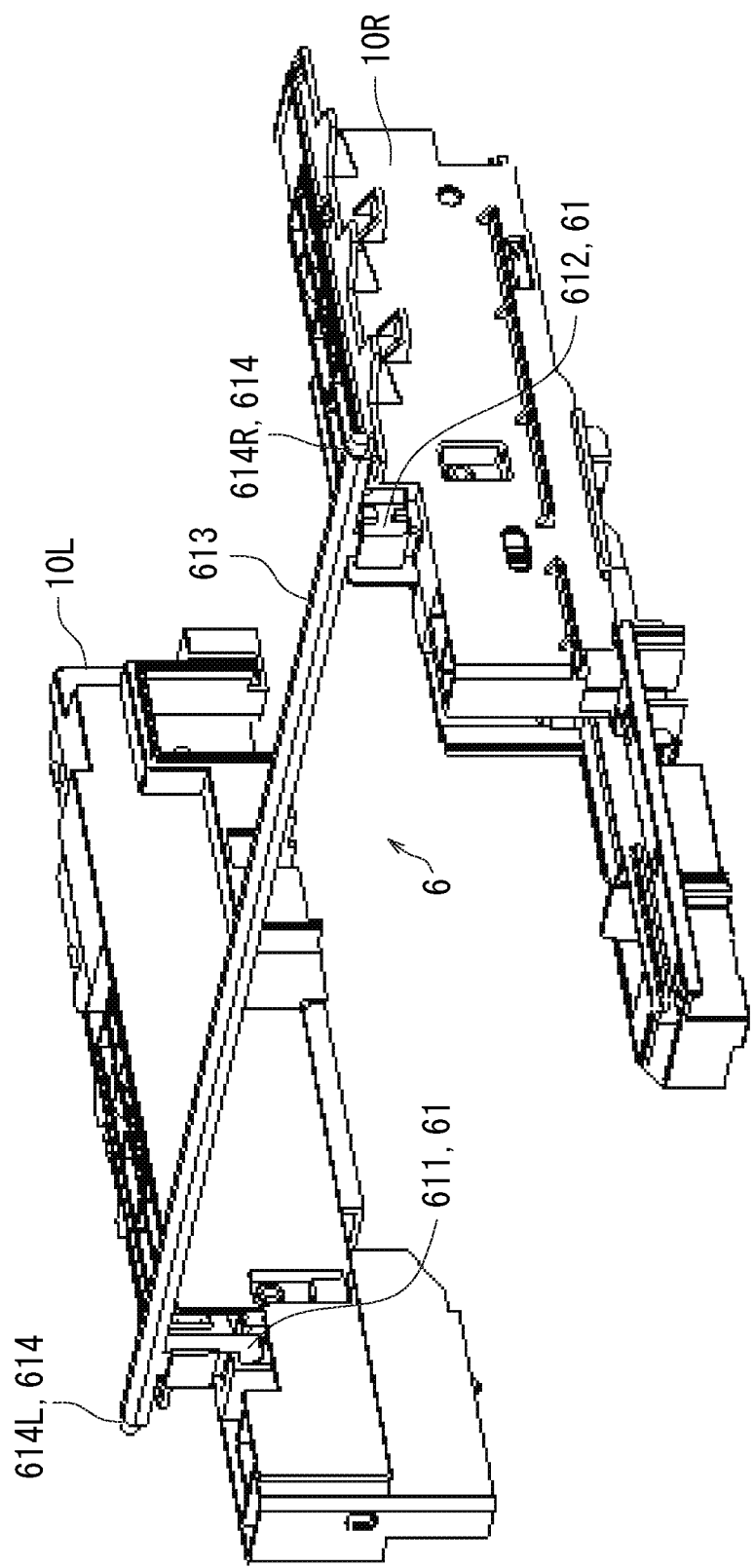
FIG. 13 is a perspective view illustrating external appearance of a lock structure according to a second embodiment of the present disclosure.

The following describes a configuration of a lock structure 6 according to the second embodiment of the present disclosure with reference to FIGS. 1, 2, 12, and 13. FIG. 12 is a perspective view illustrating external appearance of the document reader 2. FIG. 13 is a perspective view illustrating external appearance of the lock structure 6. The lock structure 6 according to the second embodiment is different from the lock structure 5 according to the first embodiment in that the former restricts move of hook members but the latter restricts pivot of hook members.

As illustrated in FIG. 12, the lock structure 6 includes a plurality of hook members 61 and a coupling member 613. The hook members 61 are disposed on the document reader 2 and secure the document reader 2 in the closed state to the main unit 1. The hook members 61 include a hook member 611 and a hook member 612. In the second embodiment, the term "a plurality of members" refers to two members.

The coupling member 613 is disposed on the document reader 2. The coupling member 613 has a columnar shape. The coupling member 613 couples the hook member 611 and the hook member 612 together. That is, the hook member 611 and the hook member 612 are fixed to one another by the coupling member 613. The coupling member 613 extends in parallel to the rotational shaft 21 (see FIG. 1). The hook member 611 and the hook member 612 are arranged in a line parallel to the rotational shaft 21.

FIG. 13 is a perspective view illustrating external appearance of the lock structure 6. As illustrated in FIG. 13, the main unit 1 includes the coupling section 10L and the coupling section 10R. The coupling section 10L is located at the upper end of the main unit 1. The coupling section 10L is disposed opposite to the hook member 611. The coupling section 10R is located at the upper end of the main unit 1. The coupling section 10R is disposed opposite to the hook member 612. The coupling sections 10L and 10R couple the document reader 2 to the main unit 1 through the lock structure 6.

The lock structure 6 further has rotational shafts 614. The rotational shafts 614 are located at opposite ends of the coupling member 613 and are integral with the coupling member 613. The rotational shafts 614 are disposed on the document reader 2 in a rotatable manner. The hook member 611 and the hook member 612 pivot about the rotational shafts 614 and the coupling member 613. The rotational shafts 614 include a rotational shaft 614L and a rotational shaft 614R. The rotational shaft 614L is one of the rotational shafts 614 that is located adjacent to the coupling section 10L. The rotational shaft 614R is the other of the rotational shafts 614 that is located adjacent to the coupling section 10R.

According to the second embodiment of the present disclosure, as described above with reference to FIGS. 1, 2, 12, and 13, the document reader 2 has the rotational shaft 21 functioning as a pivot of the opening and closing movement. The two hook members 61 (the hook member 611 and the hook member 612) are arranged in a line parallel to the rotational shaft 21. Accordingly, the two hook members 61 can be fixed to one another through a simple configuration in which the two hook members 61 are coupled together by the coupling member extending in parallel to the rotational shaft 21.

Figure 14:
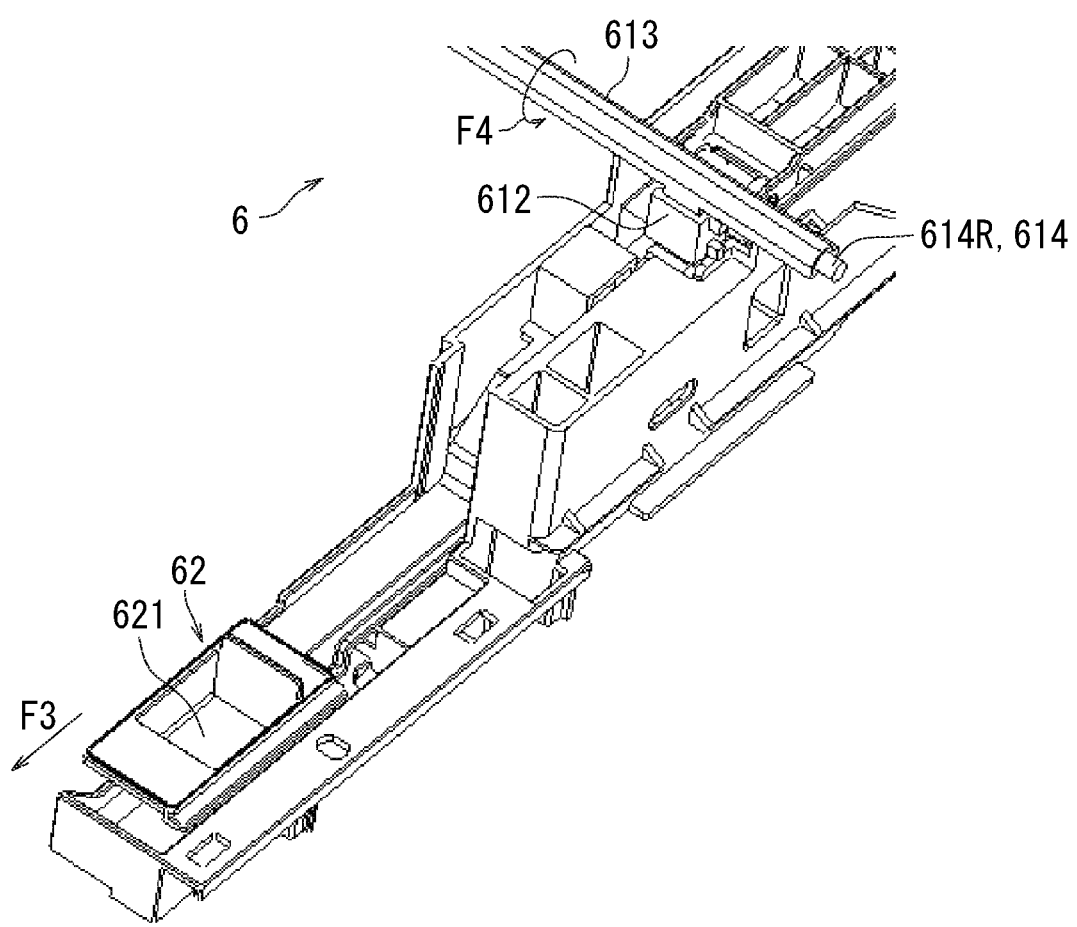
FIG. 14 is a perspective view illustrating external appearance of an unlocking lever.

The following describes an unlocking lever 62 with reference to FIGS. 2 and 12 to 14. FIG. 14 is a perspective view illustrating external appearance of the unlocking lever 62. The lock structure 6 further has the unlocking lever 62 as illustrated in FIG. 14. A user operates the unlocking lever 62 for unlocking the document reader 2 relative to the main unit 1 (for shifting the document reader 2 from the closed state to the open state).

The unlocking lever 62 includes a recess 621. The user unlocks the document reader 2 by positioning a finger in the recess 621 and pulling the recess 621 in a direction F3. More specifically, a move of the recess 621 in the direction F3 causes a group of the hook member 611, the hook member 612, and the coupling member 613 to turn in a direction F4 through a linkage mechanism. As a result, the hook member 611 disengages from a corresponding engagement member, and the hook member 612 disengages from a corresponding engagement member. Thus, the document reader 2 is unlocked relative to the main unit 1. The engagement members are disposed on the main unit 1 and engage with the hook members 611 and 612 to secure (lock) the document reader 2 in the closed state to the main unit 1. The engagement members will be described in detail with reference to FIG. 18A.

According to the lock structure 6 of the second embodiment, as described above with reference to FIGS. 2 and 12 to 14, the document reader 2 is unlocked relative to the main unit 1 by a user pulling the unlocking lever 62 in the direction F3.

Figure 15A:
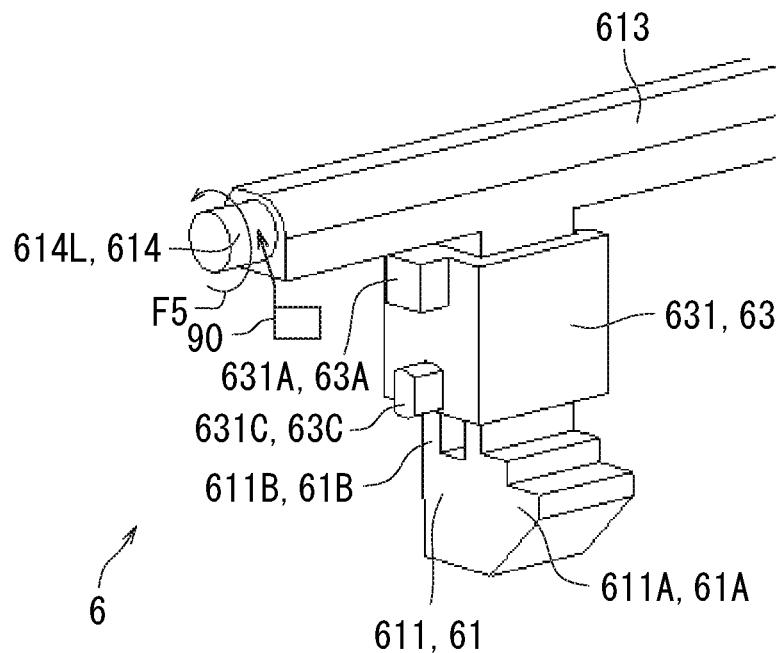
FIG. 15A is a perspective view illustrating external appearance of one of hook members.
Figure 15B:
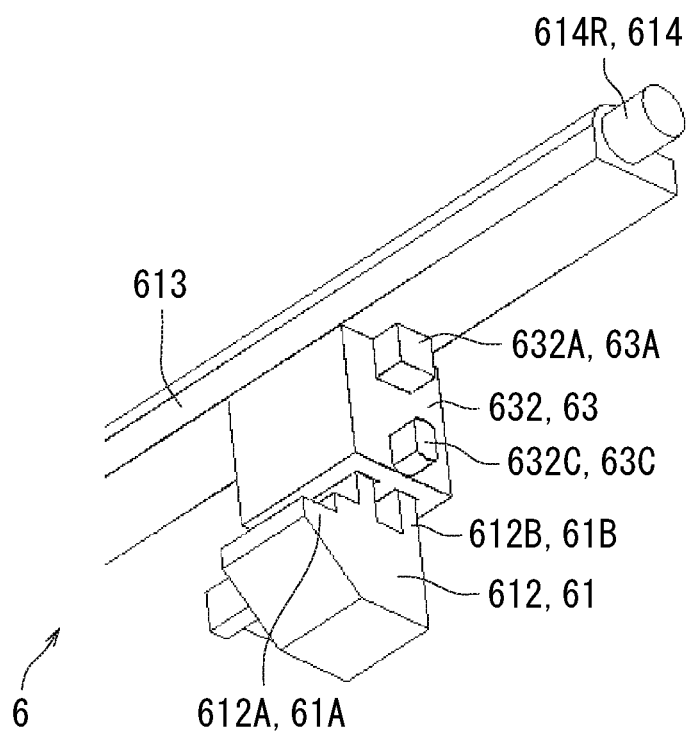
FIG. 15B is a perspective view illustrating external appearance of the other of the hook members.

The following further describes the configuration of the lock structure 6 with reference to FIGS. 12 to 15B. FIG. 15A is a perspective view illustrating external appearance of the hook member 611. FIG. 15B is a perspective view illustrating external appearance of the hook member 612.

As illustrated in FIGS. 15A and 15B, the lock structure 6 further includes a plurality of (two) pivot restricting members 63. The pivot restricting members 63 are disposed on the document reader 2 and restrict pivot of the hook members 61 (the hook member 611 and the hook member 612) in a direction for the hook members 61 to engage with the respective engagement members when at least a portion of the document reader 2 is open relative to the main unit 1. The pivot restricting members 63 are an example of what may be referred to as "restricting members".

More specifically, the pivot restricting members 63 include a pivot restricting member 631 and a pivot restricting member 632. The hook member 611 includes an engagement section 611A and a body section 611B. The body section 611B has a shape of a rectangular prism and couples the engagement section 611A to the coupling member 613. The engagement section 611A engages with the corresponding engagement member. The hook member 612 includes an engagement section 612A and a body section 612B. The body section 612B has a shape of a rectangular prism and couples the engagement section 612A to the coupling member 613. The engagement section 612A engages with the corresponding engagement member.

Hereinafter, the engagement section 611A and the engagement section 612A may be collectively referred to as an engagement section 61A. The body section 611B and the body section 612B may be collectively referred to as a body section 61B.

As illustrated in FIG. 15A, the pivot restricting member 631 is movable between a proximal position at a proximal end (an upper end) of the body section 611B of the hook member 611 and a distal position at a distal end (a lower end) of the body section 611B of the hook member 611. The pivot restricting member 631 substantially has a shape of a hollow rectangular prism surrounding an outer circumference of the body section 611B. The pivot restricting member 631 has a first projection 631A and a second projection 631C. The first projection 631A is located at an upper end of the pivot restricting member 631, and the second projection 631C is located at a lower end of the pivot restricting member 631. The first projection 631A and the second projection 631C project in a direction from the coupling member 613 toward the rotational shaft 614L along an axis of the coupling member 613. The first projection 631A and the second projection 631C are integral with the pivot restricting member 631.

The pivot restricting member 631 restricts pivot of the hook member 611 when the pivot restricting member 631 is in the distal position in the body section 611B. More specifically, the first projection 631A is in contact with a contact member to restrict pivot of the hook member 611 when the pivot restricting member 631 is in the distal position in the body section 611B. The contact member is disposed on the document reader 2. The contact member will be described in detail with reference to FIG. 17.

The pivot restricting member 631 does not restrict pivot of the hook member 611 when the pivot restricting member 631 is in the proximal position in the body section 611B. More specifically, the first projection 631A is out of contact with the contact member to not restrict pivot of the hook member 611 when the pivot restricting member 631 is in the proximal position in the body section 611B.

As illustrated in FIG. 15B, the pivot restricting member 632 is movable between a proximal position at a proximal end (an upper end) of the body section 612B of the hook member 612 and a distal position at a distal end (a lower end) of the body section 612B of the hook member 612. The pivot restricting member 632 substantially has a shape of a hollow rectangular prism surrounding an outer circumference of the body section 612B. The pivot restricting member 632 has a first projection 632A and a second projection 632C. The first projection 632A is located at an upper end of the pivot restricting member 632, and the second projection 632C is located at a lower end of the pivot restricting member 632. The first projection 632A and the second projection 632C project in a direction from the coupling member 613 toward the rotational shaft 614R along the axis of the coupling member 613.

Hereinafter, the first projection 631A and the first projection 632A may be collectively referred to as a first projection 63A. The second projection 631C and the second projection 632C may be collectively referred to as a second projection 63C.

Like the pivot restricting member 631 in the distal position in the body section 611B, the pivot restricting member 632 restricts pivot of the hook member 612 when the pivot restricting member 632 is in the distal position in the body section 612B. Like the pivot restricting member 631 in the proximal position in the body section 611B, the pivot restricting member 632 does not restrict pivot of the hook member 612 when the pivot restricting member 632 is in the proximal position in the body section 612B.

As illustrated in FIG. 15A, the lock structure 6 further includes a second biasing member 90. The second biasing member 90 is disposed on the document reader 2 and biases the rotational shaft 614L (the coupling member 613) in a direction for the rotational shaft 614L to turn in a direction F5. The second biasing member 90 for example includes a torsion coil spring. The direction F5 is a direction for the hook member 611 and the hook member 612 to engage with the respective engagement members.

According to the second embodiment of the present disclosure, as described above with reference to FIGS. 12 to 15B, the two hook members 61 (the hook member 611 and the hook member 612) are fixed to one another. When the document reader 2 is open relative to the main unit 1, the two pivot restricting members 63 (the pivot restricting member 631 and the pivot restricting member 632) restrict pivot of the two respective hook members 61 in the direction for the hook members 61 to engage with the two respective engagement members. Accordingly, when at least one side of the document reader 2 is open relative to the main unit 1, at least one of the pivot restricting members 63 restricts pivot of the corresponding hook member 61 in the direction for the hook member 61 to engage with the corresponding engagement member. As a result, all of the hook members 61 are prevented from engaging with the respective engagement members. Thus, occurrence of the "one-side closing" can be prevented even if a twisting occurs in the document reader 2 in the course of manufacture thereof. Therefore, it is not necessary to take measures to prevent occurrence of the "one-side closing" in the course of manufacture, reducing production costs.

When at least one of the two pivot restricting members 63 is in the distal position, the first projection 631A or the first projection 632A is in contact with the contact member, restricting pivot of the two hook members 61. Thus, the pivot restricting members 63 can be implemented through a simple configuration.

Figure 16A:
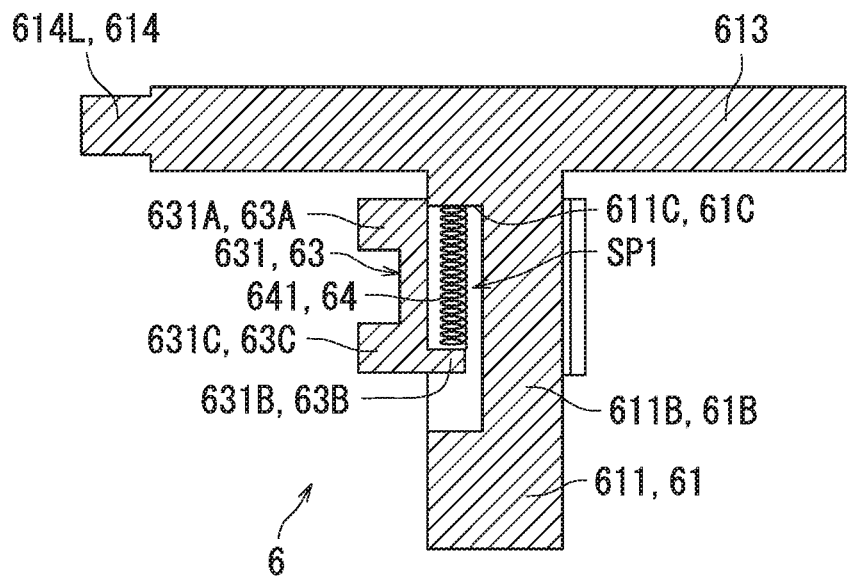
FIG. 16A is a cross-sectional view of the one hook member.
Figure 16B:
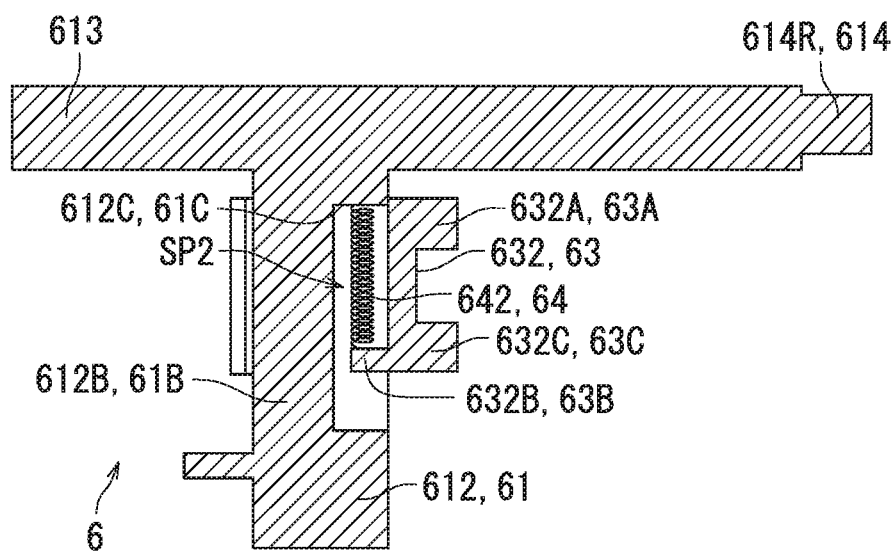
FIG. 16B is a cross-sectional view of the other hook member.

The following further describes the configuration of the lock structure 6 with reference to FIGS. 12 to 16B. FIG. 16A is a cross-sectional view of the hook member 611. FIG. 16B is a cross-sectional view of the hook member 612.

As illustrated in FIGS. 16A and 16B, the lock structure 6 further includes a plurality of (two) first biasing members 64. The first biasing members 64 are disposed on the document reader 2 and bias the two respective pivot restricting members 63 (the pivot restricting member 631 and the pivot restricting member 632). Each of the first biasing members 64 biases a corresponding one of the two pivot restricting members 63 in a direction from the proximal position toward the distal position in a corresponding one of the two hook members 61 (the hook member 611 and the hook member 612).

More specifically, the first biasing members 64 include a first biasing member 641 and a first biasing member 642.

As illustrated in FIG. 16A, the first biasing member 641 is a coil spring and biases the pivot restricting member 631 in the direction from the proximal position toward the distal position in the body section 611B of the hook member 611.

The hook member 611 further includes an inner space SP1 and an upper end surface 611C. The inner space SP1 is a space formed inside the body section 611B of the hook member 611. The inner space SP1 is elongated in the up-down direction. The upper end surface 611C is a surface that defines a part of an outer surface of the inner space SP1 and that is located at an upper end of the inner space SP1.

The pivot restricting member 631 further includes a supporting member 631B. The supporting member 631B is located at a lower end of the pivot restricting member 631. The supporting member 631B protrudes toward the inner space SP1. The supporting member 631B is integral with the pivot restricting member 631.

The first biasing member 641 in a compressed state is disposed between the supporting member 631B and the upper end surface 611C. More specifically, an upper end of the first biasing member 641 is in contact with and is supported by the upper end surface 611C, and a lower end of the first biasing member 641 is in contact with and is supported by the supporting member 631B.

As illustrated in FIG. 16B, the first biasing member 642 is a coil spring and biases the pivot restricting member 632 in the direction from the proximal position toward the distal position in the body section 612B of the hook member 612.

The hook member 612 further includes an inner space SP2 and an upper end surface 612C. The inner space SP2 is a space formed inside the body section 612B of the hook member 612. The inner space SP2 is elongated in the up-down direction. The upper end surface 612C is a surface that defines a part of an outer surface of the inner space SP2 and that is located at an upper end of the inner space SP2.

The pivot restricting member 632 further includes a supporting member 632B. The supporting member 632B is located at a lower end of the pivot restricting member 632. The supporting member 632B protrudes toward the inner space SP2. The supporting member 632B is integral with the pivot restricting member 632.

The first biasing member 642 in a compressed state is disposed between the supporting member 632B and the upper end surface 612C. More specifically, an upper end of the first biasing member 642 is in contact with and is supported by the upper end surface 612C, and a lower end of the first biasing member 642 is in contact with and is supported by the supporting member 632B.

Hereinafter, the upper end surface 611C and the upper end surface 612C may be collectively referred to as an upper end surface 61C. The supporting member 631B and the supporting member 632B may be collectively referred to as a supporting member 63B.

According to the second embodiment of the present disclosure, as described above with reference to FIGS. 12 to 16B, each of the first biasing members 64 biases a corresponding one of the pivot restricting members 63 in the direction from the proximal position toward the distal position in a corresponding one of the hook members 61. So long as no external force other than biasing force of the first biasing members 64 acts on the pivot restricting members 63, the pivot restricting members 63 are in the respective distal positions in the hook members 61. When the pivot restricting members 63 are in the respective distal positions in the hook members 61, the pivot restricting members 63 restrict pivot of the respective hook members 61. Thus, pivot of the hook members 61 can be restricted reliably.

Figure 17:
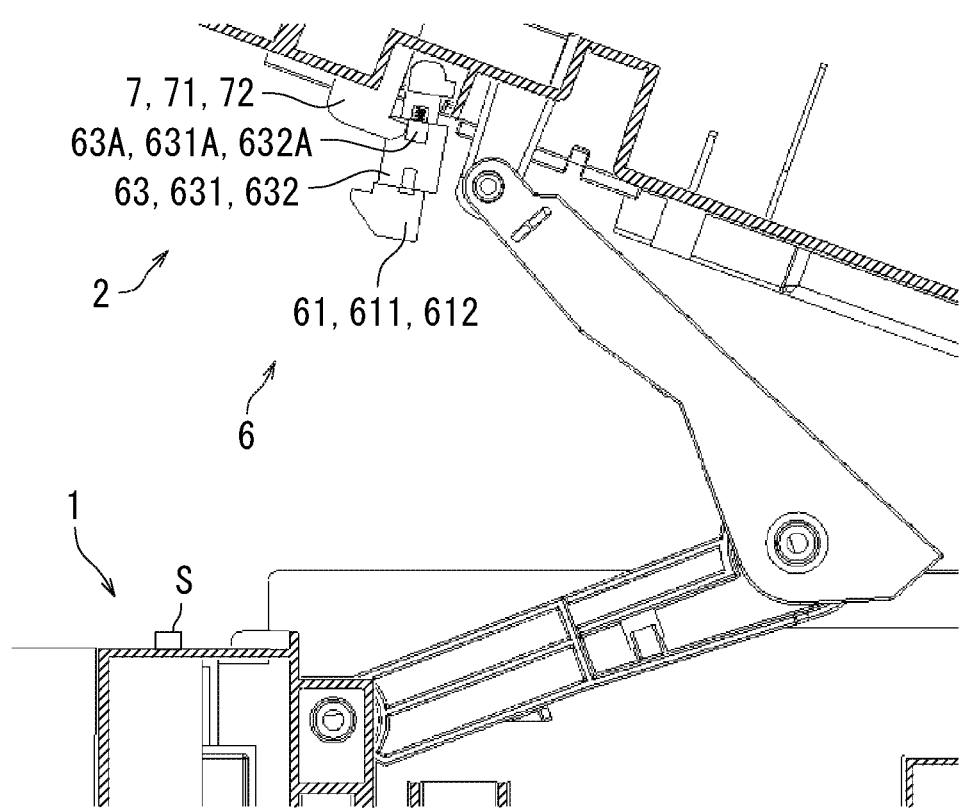
FIG. 17 is a cross-sectional view illustrating the image forming apparatus with the document reader in an open state.

The following further describes the configuration of the lock structure 6 with reference to FIGS. 2 and 12 to 17. FIG. 17 is a cross-sectional view illustrating the image forming apparatus 100 with the document reader 2 in the open state. The lock structure 6 further has contact members 7 as illustrated in FIG. 17.

The contact members 7 are disposed on the document reader 2 and are in contact with the respective pivot restricting members 63 when the document reader 2 is in the open state. The contact members 7 restrict turn of the coupling member 613 in a direction for the hook members 61 to approach the respective engagement members.

More specifically, the contact members 7 include a contact member 71 and a contact member 72. The contact member 71 is in contact with the first projection 631A of the pivot restricting member 631 when the document reader 2 is in the open state. The contact member 71 restricts turn of the coupling member 613 in the direction for the hook member 611 to approach the corresponding engagement member. The contact member 72 is in contact with the first projection 632A of the pivot restricting member 632 when the document reader 2 is in the open state. The contact member 72 restricts turn of the coupling member 613 in the direction for the hook member 612 to approach the corresponding engagement member.

The image forming apparatus 100 further includes the sensor S. The sensor S is disposed at the upper end of the main unit 1. The sensor S detects pressure applied by the lower end of the document reader 2 to thereby detect the closed state of the document reader 2. A detection signal from the sensor S is transmitted to the controller 19.

When the sensor S detects the closed state of the document reader 2, the controller 19 allows operation of the image forming device 14. The term "operation of the image forming device 14" refers to operation for forming an image on the paper P. On the other hand, when the sensor S detects the open state of the document reader 2, the controller 19 inhibits operation of the image forming device 14. That is, the controller 19 controls the image forming device 14 so that the image forming device 14 does not operate.

When the sensor S detects the open state of the document reader 2, the controller 19 also displays on the touch panel 41 information indicating that operation of the image forming device 14 is being inhibited. For example, the controller 19 displays on the touch panel 41 a message that reads: "The document reader is open, and printing is inexecutable".

According to the second embodiment of the present disclosure, as described above with reference to FIGS. 2 and 12 to 17, the contact members 7 are in contact with the respective pivot restricting members 63 to restrict turn of the coupling member 613 in the direction for the hook members 61 to approach the respective engagement members when the document reader 2 is in the open state. Thus, turn of the coupling member 613 in the direction for the hook members 61 to approach the respective engagement members can be restricted through a simple configuration.

The open state and the closed state of the document reader 2 are detected with the single sensor S. According to the second embodiment, the document reader 2 is prevented from the "one-side closing". Therefore, the open state and the closed state of the document reader 2 can be correctly detected with the single sensor S.

The controller 19 inhibits operation of the image forming device 14 and displays on the touch panel 41 information indicating that operation of the image forming device 14 is being inhibited, when the sensor S detects the open state of the document reader 2. Thus, the image forming device 14 can be inhibited from operating when the document reader 2 is in the open state. Since the controller 19 displays on the touch panel 41 information indicating that operation of the image forming device 14 is being inhibited, the user can easily recognize that operation of the image forming device 14 is being inhibited because the document reader 2 is in the open state.

The following describes operation of the lock structure 6 with reference to FIGS. 2 and 12 to 20B. FIG. 18A is a cross-sectional view illustrating the lock structure 6 with the hook members 61 in a pivot restricted state. FIG. 18B is a side view illustrating the lock structure 6 with the hook members 61 in the pivot restricted state.

Figure 18A:
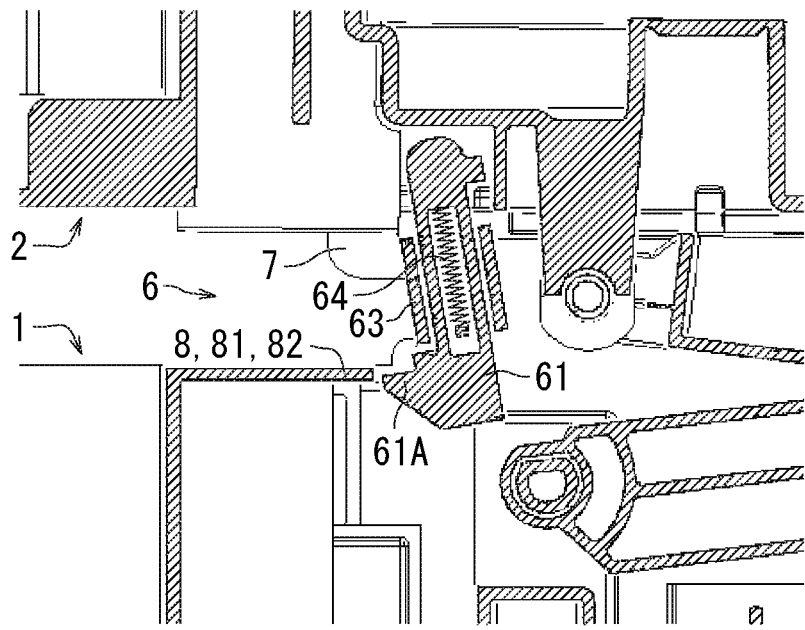
FIG. 18A is a cross-sectional view illustrating the lock structure with the hook members in a pivot restricted state.

The lock structure 6 further includes engagement members 8 as illustrated in FIG. 18A. The engagement members 8 are disposed on the main unit 1. The engagement members 8 include an engagement member 81 and an engagement member 82. The engagement member 81 engages with the hook member 611. The engagement member 82 engages with the hook member 612. The document reader 2 in the closed state is secured to the main unit 1 as a result of both the engagement member 81 and the engagement member 82 engaging with the hook member 611 and the hook member 612, respectively.

Figure 18B:
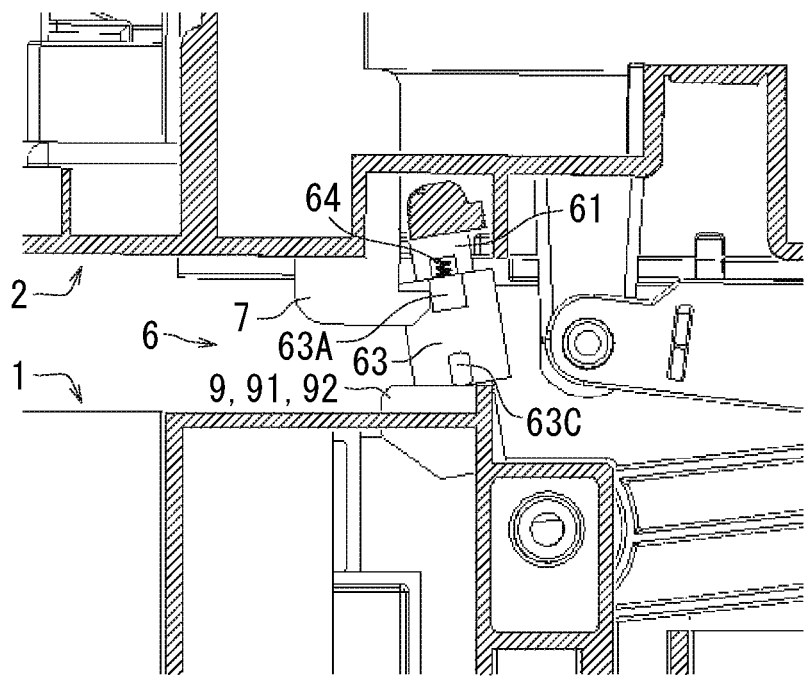
FIG. 18B is a side view illustrating the lock structure with the hook members in the pivot restricted state.

The lock structure 6 further includes unrestricting members 9 as illustrated in FIG. 18B. The unrestricting members 9 are disposed on the main unit 1. The unrestricting members 9 include an unrestricting member 91 and an unrestricting member 92. The unrestricting member 91 removes restriction of pivot of the hook member 611. More specifically, the unrestricting member 91 comes in contact with the second projection 631C of the pivot restricting member 631 to cause the pivot restricting member 631 to move from the distal position to the proximal position in the hook member 611 against biasing force of the first biasing member 641, thereby removing restriction of pivot of the hook member 611.

The unrestricting member 92 removes restriction of pivot of the hook member 612. More specifically, the unrestricting member 92 comes in contact with the second projection 632C of the pivot restricting member 632 to cause the pivot restricting member 632 to move from the distal position to the proximal position in the hook member 612 against biasing force of the first biasing member 642, thereby removing restriction of pivot of the hook member 612.

The hook member 611 and the hook member 612 operate in substantially the same manner. Hereinafter, therefore, the hook member 611 and the hook member 612 are not distinguished and collectively referred to as a hook member 61. The same applies to other elements (the pivot restricting members 63, the first biasing members 64, the contact members 7, the engagement members 8, and the unrestricting members 9).

The contact member 7 comes in contact with the first projection 63A of the pivot restricting member 63 as illustrated in FIG. 18B. That is, the pivot restricting member 63 restricts pivot of the hook member 61 in the direction for the hook member 61 to engage with the engagement member 8. Thus, the engagement section 61A of the hook member 61 is prevented from engaging with the engagement member 8 as illustrated in FIG. 18A.

Figure 19A:
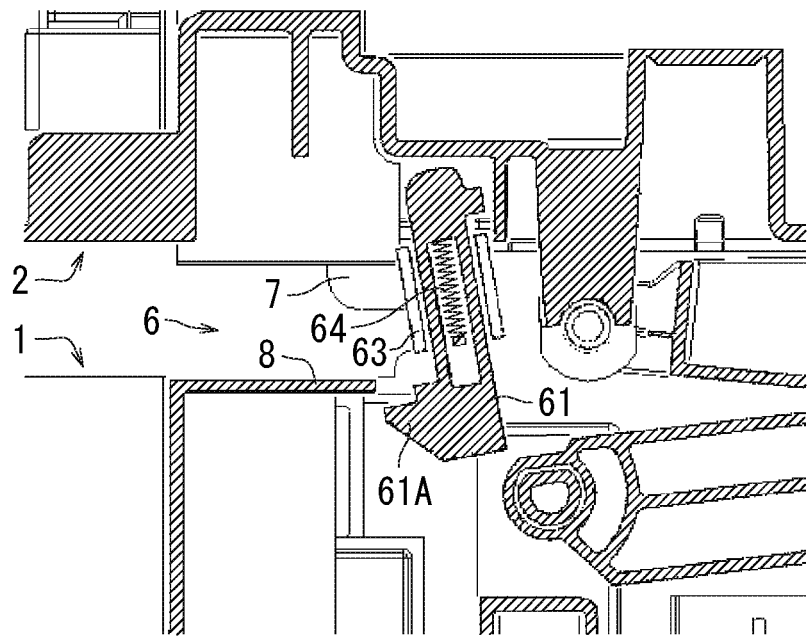
FIG. 19A is a cross-sectional view illustrating the lock structure immediately before restriction of pivot of the hook members is removed.
Figure 19B:
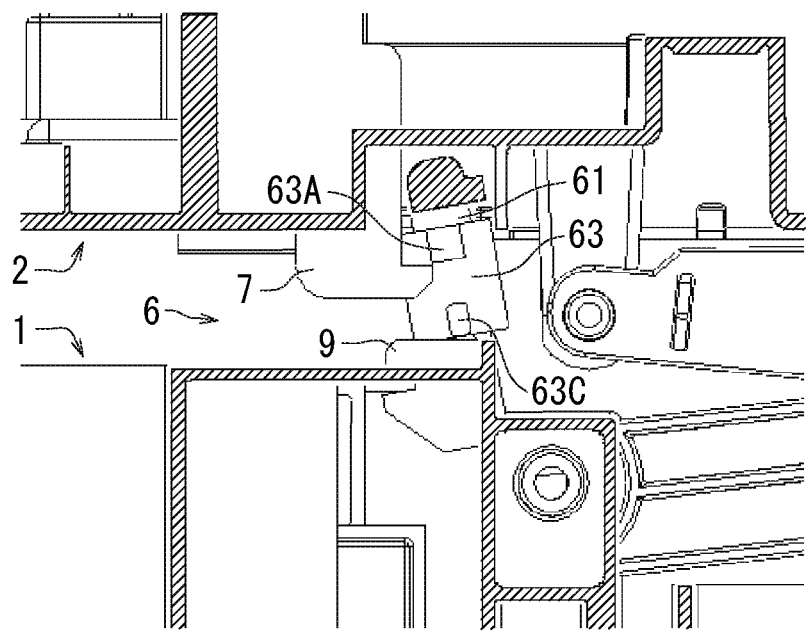
FIG. 19B is a side view illustrating the lock structure immediately before restriction of pivot of the hook members is removed.

FIG. 19A is a cross-sectional view illustrating the lock structure 6 immediately before restriction of pivot of the hook member 61 is removed. FIG. 19B is a side view illustrating the lock structure 6 immediately before restriction of pivot of the hook member 61 is removed.

The second projection 63C of the pivot restricting member 63 comes in contact with the unrestricting member 9 as illustrated in FIG. 19B. Thus, the unrestricting member 9 causes the pivot restricting member 63 to move in the direction from the distal position toward the proximal position in the hook member 61 against biasing force of the first biasing member 64. As a result, the contact member 7 is about to come out of contact with the first projection 63A in FIG. 19B.

With the contact member 7 in contact with the first projection 63A, the pivot restricting member 63 restricts pivot of the hook member 61 in the direction for the hook member 61 to engage with the engagement member 8. Thus, the engagement section 61A of the hook member 61 is prevented from engaging with the engagement member 8 as illustrated in FIG. 19A.

The first biasing member 64 is compressed more in FIG. 19A than in FIG. 18A, because the pivot restricting member 63 has moved in the direction from the distal position toward the proximal position in the hook member 61 in FIG. 19A.

Figure 20A:
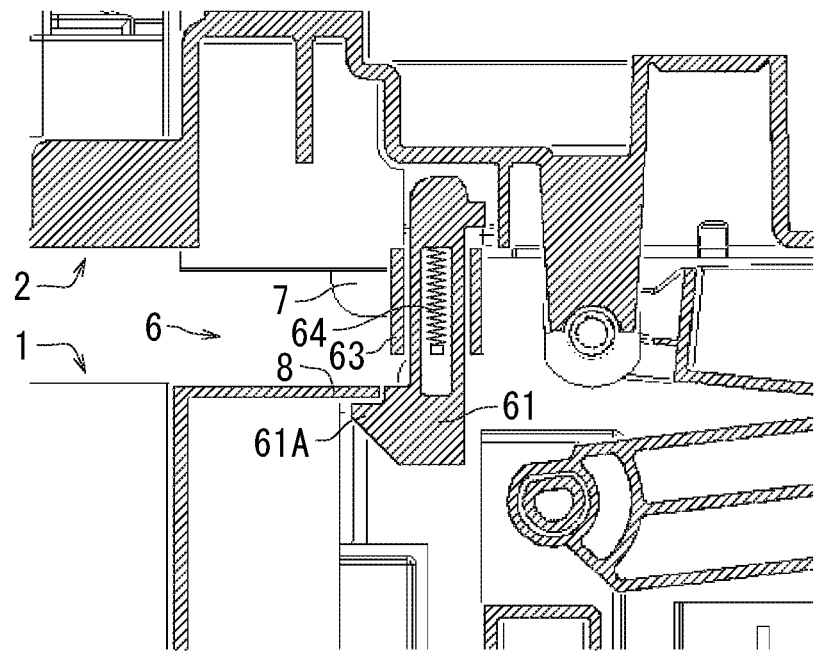
FIG. 20A is a cross-sectional view illustrating the lock structure with the hook members and the engagement members in an engaged state.
Figure 20B:
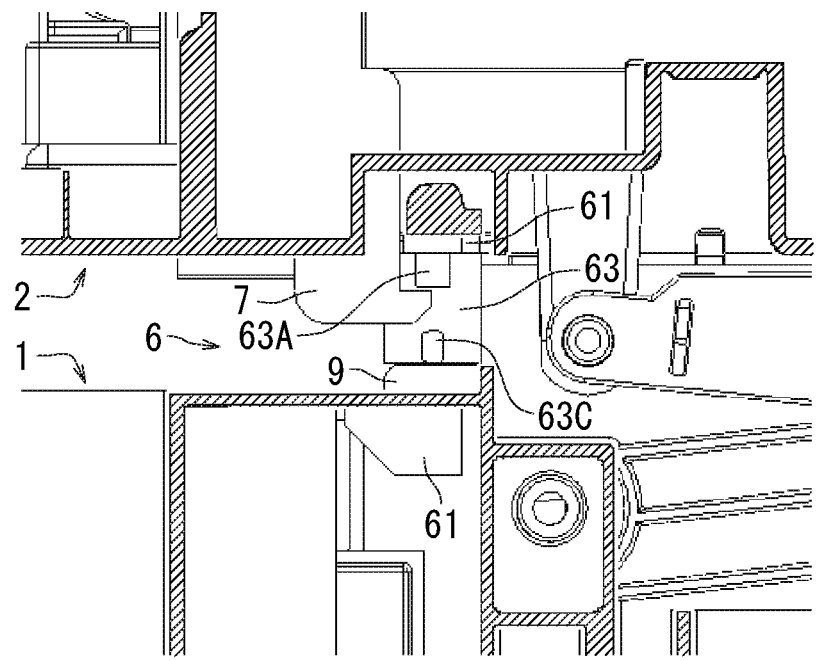
FIG. 20B is a side view illustrating the lock structure with the hook members and the engagement members in the engaged state.

FIG. 20A is a cross-sectional view illustrating the lock structure 6 with the hook member 61 and the engagement member 8 in an engaged state. FIG. 20B is a side view illustrating the lock structure 6 with the hook member 61 and the engagement member 8 in the engaged state.

The second projection 63C of the pivot restricting member 63 comes in contact with the unrestricting member 9 as illustrated in FIG. 20B. Thus, the unrestricting member 9 causes the pivot restricting member 63 to further move in the direction from the distal position toward the proximal position in the hook member 61 against biasing force of the first biasing member 64. As a result, the contact member 7 comes out of contact with the first projection 63A.

The hook member 61 then pivots in the direction for the hook member 61 to engage with the engagement member 8. More specifically, biasing force of the second biasing member 90 (see FIG. 15A) causes the hook member 61 to pivot in the direction for the hook member 61 to engage with the engagement member 8. As a result, the hook member 61 engages with the engagement member 8 as illustrated in FIG. 20A. Thus, the document reader 2 in the closed state is secured to the main unit 1.

According to the second embodiment of the present disclosure, as described above with reference to FIGS. 2 and 12 to 20B, the unrestricting member 9 causes the pivot restricting member 63 to move from the distal position to the proximal position in the hook member 61 against biasing force of the first biasing member 64 to remove restriction of pivot of the hook member 61, when the document reader 2 shifts from the open state to the closed state. Thus, the unrestricting member 9 can be implemented through a simple configuration.

The two unrestricting members 9 (the unrestricting member 91 and the unrestricting member 92) remove restriction of pivot of the two respective hook members 61 (the hook member 611 and the hook member 612). Accordingly, when all of the unrestricting members 9 have removed restriction of pivot of all of the hook members 61, all of the hook members 61 engage with the engagement members 8, and the document reader 2 in the closed state is secured (locked) to the main unit 1. When at least one of the unrestricting members 9 has not removed restriction of pivot of a corresponding one of the hook members 61, pivot of all of the hook members 61 is kept restricted. As a result, all of the hook members 61 are prevented from engaging with the respective engagement members 8. Thus, occurrence of the "one-side closing" can be prevented even if a twisting occurs in the document reader 2 in the course of manufacture thereof. Therefore, it is not necessary to take measures to prevent occurrence of the "one-side closing" in the course of manufacture, reducing production costs.

When at least a portion of the document reader 2 is open, at least one of the two pivot restricting members 63 is in contact with the corresponding contact member 7, restricting pivot of the corresponding hook member 61. Thus, pivot of the hook members 61 can be restricted through a simple configuration.

Through the above, embodiments (the first and second embodiments) of the present disclosure have been described with reference to the drawings. However, the present disclosure is not limited to the above embodiments and may be implemented in various different forms that do not deviate from the essence of the present disclosure (for example, as described below in sections (1) to (10)). The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, properties of elements of configuration described in the above embodiments, such as shapes and dimensions, are merely examples and are not intended as specific limitations. Various alterations may be made so long as there is no substantial deviation from the effects of the present disclosure.

(1) Although the description has been given with reference to FIG. 1 using an example in which the image forming apparatus 100 is a color multifunction peripheral, the present disclosure is not limited to such an example. It is only necessary that the image forming apparatus forms an image on the paper P. In an embodiment, for example, the image forming apparatus may be a color copier. In another embodiment, for example, the image forming apparatus may be a monochrome printer.

(2) Although the description has been given with reference to FIGS. 1 to 3 using an example in which the document reader 2 corresponds to the "openable member", the present disclosure is not limited to such an example. It is only necessary that the "openable member" is openable and closable relative to the main unit 1. For example, the "openable member" may be a cover openable and closable relative to the main unit 1.

(3) Although the description has been given with reference to FIGS. 1 to 3 using an example in which the lock structure 5 includes two hook members 51, the present disclosure is not limited to such an example. It is only necessary that the lock structure 5 includes a plurality of hook members 51. In an embodiment, the lock structure 5 may include three or more hook members 51.

(4) Although the description has been given with reference to FIGS. 1 to 3 using an example in which the lock structure 5 includes two engagement members 58, the present disclosure is not limited to such an example. It is only necessary that the lock structure 5 includes a plurality of engagement members 58. In an embodiment, the lock structure 5 may include three or more engagement members 58.

(5) Although the description has been given with reference to FIGS. 1 to 3 using an example in which the lock structure 5 includes two move restricting members 53, the present disclosure is not limited to such an example. It is only necessary that the lock structure 5 includes a plurality of move restricting members 53. In an embodiment, the lock structure 5 may include three or more move restricting members 53.

(6) Although the description has been given with reference to FIGS. 1 to 3 using an example in which the lock structure 5 includes two unrestricting members 57, the present disclosure is not limited to such an example. It is only necessary that the lock structure 5 includes a plurality of unrestricting members 57. In an embodiment, the lock structure 5 may include three or more unrestricting members 57.

(7) Although the description has been given with reference to FIGS. 1 to 3 using an example in which the move restricting members 53 come in contact with the contact sections 56 to restrict move of the respective hook members 51, the present disclosure is not limited to such an example. It is only necessary that the move restricting members 53 restrict move of the hook members 51. In an embodiment, for example, the move restricting members 53 may come into recesses to restrict move of the respective hook members 51.

(8) Although the description has been given with reference to FIGS. 1 to 3 using an example in which the lock structure 5 is applied to the image forming apparatus 100, the present disclosure is not limited to such an example. It is only necessary that the lock structure 5 locks the openable member in a closed state relative to a main unit of an apparatus. In an embodiment, for example, the lock structure 5 may be applied to an electronic device such as a digital versatile disc (DVD) player.

(9) Although the description has been given with reference to FIGS. 1, 2, 12, and 13 using an example in which the lock structure 6 includes two hook members 61, the present disclosure is not limited to such an example. It is only necessary that the lock structure 6 includes a plurality of hook members 61. In an embodiment, the lock structure 6 may include three or more hook members 61. Likewise, in an embodiment, the lock structure 6 may include three or more engagement members 8. In an embodiment, the lock structure 6 may include three or more pivot restricting members 63. In an embodiment, the lock structure 6 may include three or more unrestricting members 9.

(10) Although the description has been given with reference to FIGS. 1, 2, and 12 to 20A using an example in which the lock structure 6 is applied to the image forming apparatus 100, the present disclosure is not limited to such an example. It is only necessary that the lock structure 6 locks the openable member in a closed state relative to the main unit 1. In an embodiment, for example, the lock structure 6 may be applied to an electronic device such as a digital versatile disc (DVD) player.

What is claimed is:

1. A lock structure for locking an openable member in a closed state relative to a main unit of an apparatus, the openable member being openable and closable relative to the main unit, the lock structure comprising:
a plurality of engagement members disposed on the main unit;
a plurality of hook members disposed on the openable member and configured to engage with the respective engagement members to secure the openable member in the closed state to the main unit;
a plurality of restricting members disposed on the openable member and configured to restrict move or pivot of the respective hook members in a direction for the hook members to engage with the respective engagement members when at least a portion of the openable member is open relative to the main unit;
a plurality of unrestricting members disposed on the openable member; and
a plurality of first biasing members, wherein
the hook members are fixed to one another,
the restricting members are move restricting members configured to restrict move of the respective hook members in the direction for the hook members to engage with the respective engagement members when at least a portion of the openable member is open relative to the main unit,
the unrestricting members remove restriction of move of the respective hook members by the respective move restricting members,
the first biasing members bias the respective move restricting members in a downward direction such that one side end of each of the move restricting members protrudes downward from a lower end of a corresponding one of the hook members, and
when the openable member shifts from an open state to the closed state,
the one side end of each of the move restricting members comes in contact with a corresponding one of the unrestricting members, and
each of the unrestricting members pushes the one side end of a corresponding one of the move restricting members in an upward direction to remove restriction of move of a corresponding one of the hook members.

2. The lock structure according to claim 1, wherein
the move restricting members are movable in directions away from and toward the openable member, and
when the openable member shifts from an open state to the closed state,
the move restricting members come in contact with the respective unrestricting members, and
the unrestricting members remove restriction of move of the respective hook members.

3. The lock structure according to claim 1, wherein
the move restricting members are arranged at positions in one-to-one correspondence with the hook members.

4. The lock structure according to claim 1, wherein
the openable member has a rotational shaft functioning as a pivot of opening and closing movement of the openable member, and
the hook members are arranged in a line substantially parallel to the rotational shaft.

5. An image forming apparatus comprising:
the lock structure according to claim 1; and
an image forming device configured to form an image on a recording medium.

6. A lock structure for locking an openable member in a closed state relative to a main unit of an apparatus, the openable member being openable and closable relative to the main unit, the lock structure comprising:
a plurality of engagement members disposed on the main unit;
a plurality of hook members disposed on the openable member and configured to engage with the respective engagement members to secure the openable member in the closed state to the main unit;
a plurality of restricting members disposed on the openable member and configured to restrict move or pivot of the respective hook members in a direction for the hook members to engage with the respective engagement members when at least a portion of the openable member is open relative to the main unit;
a plurality of unrestricting members disposed on the openable member;
a columnar coupling member coupling the hook members together; and
a supporting member supporting the coupling member such that the coupling member is slidable when the hook members move in a direction toward the respective engagement members or in a direction away from the respective engagement members, wherein
the hook members are fixed to one another,
the restricting members are move restricting members configured to restrict move of the respective hook members in the direction for the hook members to engage with the respective engagement members when at least a portion of the openable member is open relative to the main unit,
the unrestricting members remove restriction of move of the respective hook members by the respective move restricting members,
the supporting member has a plurality of contact sections, and
when the openable member is in an open state, the move restricting members are in contact with the respective contact sections to restrict move of the respective hook members.

7. The lock structure according to claim 6, further comprising
a second biasing member configured to bias a group of the coupling member and the hook members in a direction for the hook members to engage with the respective engagement members.

8. The lock structure according to claim 6, further comprising
an unlocking lever configured to unlock the openable member relative to the main unit, wherein
the unlocking lever has a recess, and
the unlocking lever causes a group of the coupling member and the hook members to move in a direction for the hook members to disengage from the respective engagement members through the recess being pulled in a specific direction.

9. An image forming apparatus comprising:
a lock structure for locking an openable member in a closed state relative to a main unit of an apparatus, the openable member being openable and closable relative to the main unit;
an image forming device configured to form an image on a recording medium;

a sensor configured to detect an open state and a closed state of the openable member; and
a controller,
the lock structure comprising:
- a plurality of engagement members disposed on the main unit;
- a plurality of hook members disposed on the openable member and configured to engage with the respective engagement members to secure the openable member in the closed state to the main unit; and
- a plurality of restricting members disposed on the openable member and configured to restrict move or pivot of the respective hook members in a direction for the hook members to engage with the respective engagement members when at least a portion of the openable member is open relative to the main unit, wherein the hook members are fixed to one another, and
when the sensor detects the open state of the openable member, the controller inhibits operation of the image forming device.

10. The image forming apparatus according to claim 9, further comprising
a display configured to display an image, wherein
when the sensor detects the open state of the openable member, information indicating that operation of the image forming device is being inhibited is displayed on the display.

11. The image forming apparatus according to claim 9, further comprising
a document reader configured to read an image from a document, wherein
the openable member and the document reader are fixed to one another.

12. A lock structure for locking an openable member in a closed state relative to a main unit of an apparatus, the openable member being openable and closable relative to the main unit, the lock structure comprising:
- a plurality of engagement members disposed on the main unit;
- a plurality of hook members disposed on the openable member and configured to engage with the respective engagement members to secure the openable member in the closed state to the main unit;
- a plurality of restricting members disposed on the openable member and configured to restrict move or pivot of the respective hook members in a direction for the hook members to engage with the respective engagement members when at least a portion of the openable member is open relative to the main unit;
- a plurality of unrestricting members disposed on the openable member;
- a columnar coupling member disposed on the openable member and coupling the hook members together;
- a supporting member disposed on the openable member and supporting the coupling member such that the coupling member is turnable;
- a second biasing member disposed on the openable member and configured to bias the coupling member such that the coupling member turns in a direction for the hook members to approach the respective engagement members; and
- a plurality of contact members disposed on the openable member and configured to be in contact with the respective pivot restricting members to restrict turn of the coupling member in the direction for the hook members to approach the respective engagement members when the openable member is in an open state, wherein the hook members are fixed to one another,
the restricting members are pivot restricting members configured to restrict pivot of the respective hook members in the direction for the hook members to engage with the respective engagement members when at least a portion of the openable member is open relative to the main unit, and
the unrestricting members remove restriction of pivot of the respective hook members.

13. The lock structure according to claim 12, further comprising
an unlocking lever configured to unlock the openable member relative to the main unit, wherein
the unlocking lever has a recess, and
the unlocking lever causes a group of the coupling member and the hook members to pivot in a direction for the hook members to disengage from the respective engagement members through the recess being pulled in a specific direction.

* * * * *